(12) United States Patent  
Ziemer

(10) Patent No.: US 6,960,149 B2  
(45) Date of Patent: Nov. 1, 2005

(54) MULTISTEP REDUCTION GEAR

(75) Inventor: Peter Ziemer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 5 days.

(21) Appl. No.: 10/472,918

(22) PCT Filed: Mar. 27, 2002

(86) PCT No.: PCT/EP02/03433

§ 371 (c)(1),
(2), (4) Date: Sep. 24, 2003

(87) PCT Pub. No.: WO02/079669

PCT Pub. Date: Oct. 10, 2002

(65) Prior Publication Data

US 2004/0048716 A1    Mar. 11, 2004

(30) Foreign Application Priority Data

Mar. 30, 2001 (DE) ................... 101 15 995

(51) Int. Cl.$^7$ .......................................... F16H 3/62
(52) U.S. Cl. .................. 475/276; 475/278; 475/280
(58) Field of Search ................... 475/275, 276, 475/277, 278, 280, 296

(56) References Cited

U.S. PATENT DOCUMENTS

| | | | |
|---|---|---|---|
| 3,452,621 A | * | 7/1969 | Golan et al. ............... 475/122 |
| 3,956,946 A | | 5/1976 | Murakami et al. ............ 74/759 |
| 3,971,268 A | | 7/1976 | Murakami et al. ............ 74/759 |
| 4,046,031 A | | 9/1977 | Ott et al. ...................... 74/764 |
| 4,178,813 A | * | 12/1979 | Smemo ....................... 475/54 |
| 4,205,563 A | * | 6/1980 | Gorrell ....................... 475/59 |
| 4,531,428 A | * | 7/1985 | Windish .................... 475/279 |
| 4,683,776 A | | 8/1987 | Klemen ...................... 74/765 |
| 5,924,951 A | | 7/1999 | Winzeler et al. ............ 475/275 |
| 5,954,613 A | * | 9/1999 | Park ........................... 475/275 |
| 6,176,803 B1 | | 1/2001 | Meyer et al. ............... 475/286 |

FOREIGN PATENT DOCUMENTS

| | | | | |
|---|---|---|---|---|
| DE | 2 065 393 | | 8/1973 | ............ F16H 3/58 |
| DE | 20 53 321 | | 6/1980 | ............ B60K 17/08 |
| DE | 42 38 025 A1 | | 5/1994 | ............ F16H 3/66 |
| DE | 4238025 | * | 5/1994 | |
| DE | 199 49 507 A1 | | 4/2001 | ............ F16H 3/66 |
| EP | 0 239 205 B1 | | 4/1991 | ............ F16H 3/66 |
| GB | 1 338 450 | | 11/1973 | ............ F16H 3/66 |
| JP | 52074766 | | 6/1977 | ............ F16H 3/62 |
| JP | 5072066 | | 3/1993 | ............ G01L 5/28 |
| JP | 2000234655 A | | 8/2000 | ............ F16H 3/66 |

* cited by examiner

Primary Examiner—Ha Ho  
(74) Attorney, Agent, or Firm—Davis & Bujold, P.L.L.C.

(57) ABSTRACT

A multi-step reduction gear having a drive shaft (1) connected to a front-mounted gear group (VS) having switch elements (A, B, C, D, E) which is connected to a rear-mounted gear group (NS) having switch elements (M, H, L) by a spacer shaft (2) rotating at an output speed (nvs) of the front-mounted gear group (VS). An input speed (n) of the drive shaft (1) can be transmitted to an output shaft (3) for at least seven forward gears wherein a change from one gear to the next highest or next lowest gear only requires a disconnection of one switch element and a connection of one other switch element.

28 Claims, 22 Drawing Sheets

| Path | Closed switching-element | | | | | | Transmission | Level | Inclination |
|------|---|---|---|---|---|---|---|---|---|
| | A | B | C | D | M | H | | | |
| 1 | O | | | O | O | | 5,71 | 1,77 | |
| 2 | O | | O | | O | | 3,23 | 1,61 | |
| 3 | O | O | | | O | | 2,00 | 1,50 | |
| 4 | (O) | | | | O | O | 1,33 | 1,33 | 10,0 |
| 5 | O | O | | | | O | 1,00 | 1,19 | |
| 6 | O | | O | | | O | 0,84 | 1,11 | |
| 7 | O | | | O | | O | 0,75 | 1,13 | |
| 8 | | | O | O | | O | 0,67 | 1,17 | |
| 9 | | O | | O | | O | 0,57 | | |
| R | | O | | O | O | | -4,07 | | |

State transmissions:

$i_{0\,VS1} = -1,90$ $i_{0\,VS2} = -2,04$ $i_{0\,NS1} = -3,00$ $i_{0\,NS2} = -2,00$

| Path | Closed switching-element | | | | | | Transmission | Level | Inclination |
|---|---|---|---|---|---|---|---|---|---|
| | A | B | D | E | M | H | | | |
| 1 | O | O | | | O | | 5,71 | 1,77 | |
| 2 | O | | | O | O | | 3,23 | 1,61 | |
| 3 | | O | | O | O | | 2,00 | 1,50 | |
| 4 | | | | (O) | O | O | 1,33 | 1,33 | 10,0 |
| 5 | | O | | O | | O | 1,00 | 1,19 | |
| 6 | O | | | O | | O | 0,84 | 1,11 | |
| 7 | O | O | | | | O | 0,75 | 1,13 | |
| 8 | O | | O | | | O | 0,67 | 1,17 | |
| 9 | | O | O | | | O | 0,57 | | |
| R | | O | O | | O | | -4,07 | | |

State transmissions:

$i_{0\,VS1}$ = -1,62
$i_{0\,VS2}$ = -2,04
$i_{0\,NS1}$ = -3,00
$i_{0\,NS2}$ = -2,00

| Path | Closed switching-element | | | | | | Transmission | Level | Inclination |
|---|---|---|---|---|---|---|---|---|---|
| | A | B | C | D | M | H | | | |
| 1 | O | | | O | O | | 5,71 | | |
| 2 | O | | O | | O | | 3,23 | 1,77 | |
| 3 | O | O | | | O | | 2,00 | 1,61 | |
| 4 | | (O) | | | O | O | 1,33 | 1,50 | 10,0 |
| 5 | O | O | | | | O | 1,00 | 1,33 | |
| 6 | O | | O | | | O | 0,84 | 1,19 | |
| 7 | O | | | O | | O | 0,75 | 1,11 | |
| 8 | | | O | O | | O | 0,67 | 1,13 | |
| 9 | | O | | O | | O | 0,57 | 1,17 | |
| R | | O | O | | O | | -4,07 | | |

State transmissions:

$i_{0\,VS1} = +2.90$
$i_{0\,VS2} = -2.04$
$i_{0\,NS1} = -3.00$
$i_{0\,NS2} = +3.00$

| Path | Closed switching-element | | | | | | | Transmission | Level | Inclination |
|---|---|---|---|---|---|---|---|---|---|---|
| | A | B | C | D | E | M | H | | | |
| 1 | O | O | | | | O | | 7,50 | 2,00 | |
| 2 | O | | | O | | O | | 3,75 | 1,50 | |
| 3 | | O | | O | | O | | 2,50 | 1,33 | |
| 4 | | | O | O | | O | | 1,88 | 1,25 | |
| 5 | | | | | (O) | O | O | 1,50 | 1,25 | |
| 6 | | O | O | | | | O | 1,20 | 1,20 | 12,5 |
| 7 | | O | | O | | | O | 1,00 | 1,17 | |
| 8 | O | | | O | | | O | 0,86 | 1,15 | |
| 9 | O | O | | | | | O | 0,75 | 1,13 | |
| 10 | O | | O | | | | O | 0,67 | 1,11 | |
| 11 | | O | O | | | | O | 0,60 | | |
| R | | O | | O | | O | | -7,50 | | |

State transmissions:

$i_{0\,VS1}$ = -2.00
$i_{0\,VS2}$ = -3.00
$i_{0\,NS1}$ = -2.00
$i_{0\,NS2}$ = -2.00

| Path | Closed switching-element | | | | | | | Transmission | Level | Inclination |
|---|---|---|---|---|---|---|---|---|---|---|
| | A | B | C | D | E | M | H | | | |
| 1 | O | | | O | | O | | 7,50 | 2,00 | |
| 2 | O | | O | | | O | | 3,75 | 1,50 | |
| 3 | O | | | | O | O | | 2,50 | 1,33 | |
| 4 | | | O | | O | O | | 1,88 | 1,25 | |
| 5 | | | | | (O) | O | O | 1,50 | 1,25 | 12,5 |
| 6 | | | O | | O | | O | 1,20 | 1,20 | |
| 7 | O | | | | O | | O | 1,00 | 1,17 | |
| 8 | O | | O | | | | O | 0,86 | 1,15 | |
| 9 | O | | | O | | | O | 0,75 | 1,13 | |
| 10 | | | O | O | | | O | 0,67 | 1,11 | |
| 11 | | O | | O | | | O | 0,60 | | |
| R | | O | O | | | O | | -7,50 | | |

State transmissions:

$i_{0\,VS1} = -2.00$   $i_{0\,VS1} = -2.00$
$i_{0\,VS2} = -3.00$   $i_{0\,VS1} = -1.50$

| Path | Closed switching-element | | | | | | | Transmission | Level | Inclination |
|---|---|---|---|---|---|---|---|---|---|---|
| | A | B | C | D | E | M | H | | | |
| 1 | O | | | O | | O | | 10,00 | 2,00 | |
| 2 | O | | O | | | O | | 5,00 | 1,56 | |
| 3 | O | O | | | | O | | 3,20 | 1,28 | |
| 4 | O | | | | O | O | | 2,50 | 1,23 | |
| 5 | | O | | | O | O | | 2,04 | 1,22 | |
| 6 | | | O | | O | O | | 1,67 | 1,11 | 16,4 |
| 7 | | | | (O) | O | | O | 1,50 | 1,13 | |
| 8 | | | O | | O | | O | 1,33 | 1,18 | |
| 9 | | O | | | O | | O | 1,13 | 1,13 | |
| 10 | O | | | | O | | O | 1,00 | 1,11 | |
| 11 | O | O | | | | | O | 0,90 | 1,12 | |
| 12 | O | | O | | | | O | 0,80 | 1,10 | |
| 13 | O | | | O | | | O | 0,73 | 1,09 | |
| 14 | | | O | O | | | O | 0,67 | 1,10 | |
| 15 | | O | | O | | | O | 0,61 | | |
| R | | O | O | | | O | | -9,12 | | |

State transmissions:

$i_{0VSa} = +2,20$    $i_{0VS1} = -3,00$    $i_{0NS1} = -2,00$ $i_{0VS2} = -2,00$    $i_{0NS2} = -2,00$

| Path | Closed switching-element | | | | | | Transmission | Level | Inclination |
|---|---|---|---|---|---|---|---|---|---|
| | A | B | D | M | H | L | | | |
| 1 | | O | O | | | O | 5,60 | 1,75 | |
| 2 | | | (O) | O | | O | 3,20 | 1,44 | |
| 3 | | O | O | O | | | 2,22 | 1,41 | |
| 4 | O | | O | O | | | 1,58 | 1,29 | 8,6 |
| 5 | O | O | | O | | | 1,22 | 1,22 | |
| 6 | | (O) | | O | O | | 1,00 | 1,18 | |
| 7 | O | O | | | O | | 0,85 | 1,15 | |
| 8 | O | | O | | O | | 0,74 | 1,14 | |
| 9 | | O | O | | O | | 0,65 | | |
| R | O | O | | | | O | -5,60 | | |

State transmissions:

$i_{0\,VS1} = -3,00$
$i_{0\,VS2} = -2,00$
$i_{0\,NS1} = -2,20$
$i_{0\,NS2} = -2,80$

| Path | Closed switching-element | | | | | | Transmission | Level | Inclination |
|---|---|---|---|---|---|---|---|---|---|
| | A | B | D | M | H | L | | | |
| 1 | | | O | | | O | 5,60 | 1,75 | 8,6 |
| 2 | | | | O | | O | 3,20 | 1,44 | |
| 3 | | | O | O | | | 2,22 | 1,41 | |
| 4 | | O | | O | | | 1,58 | 1,29 | |
| 5 | O | | | O | | | 1,22 | 1,22 | |
| 6 | | | | O | O | | 1,00 | 1,18 | |
| 7 | O | | | | O | | 0,85 | 1,15 | |
| 8 | | O | | | O | | 0,74 | 1,14 | |
| 9 | | | O | | O | | 0,65 | | |
| R | O | | | | | O | -5,60 | | |

State transmissions:

$i_{0\,VS1} = -3,00$
$i_{0\,VS2} = -2,00$
$i_{0\,NS1} = -2,20$
$i_{0\,NS2} = -2,80$

| Path | Closed switching-element | | | | | | Transmission | Level | Inclination |
|---|---|---|---|---|---|---|---|---|---|
| | A | B | D | M | H | L | | | |
| 1 | | | O | | | O | 5,60 | | |
| 2 | | | | O | | O | 3,20 | 1,75 | |
| 3 | | | O | O | | | 2,22 | 1,44 | |
| 4 | | O | | O | | | 1,58 | 1,41 | |
| 5 | O | | | O | | | 1,22 | 1,29 | 8,6 |
| 6 | | | | O | O | | 1,00 | 1,22 | |
| 7 | O | | | | O | | 0,85 | 1,18 | |
| 8 | | O | | | O | | 0,74 | 1,15 | |
| 9 | | | O | | O | | 0,65 | 1,14 | |
| R | O | | | | | O | -5,60 | | |

State transmissions:

$i_{0VS1} = -3,00$
$i_{0VS2} = +3,00$
$i_{0NS1} = +3,20$
$i_{0NS2} = -2,80$

| Path | Closed switching-element | | | | | | Transmission | Level | Inclination |
|---|---|---|---|---|---|---|---|---|---|
| | A | B | D | M | H | L | | | |
| 1 | | | O | | | O | 5,88 | 1,57 | |
| 2 | | | | O | | O | 3,75 | 1,38 | |
| 3 | | | O | O | | | 2,71 | 1,49 | |
| 4 | | O | | O | | | 1,82 | 1,38 | 9,4 |
| 5 | O | | | O | | | 1,32 | 1,32 | |
| 6 | | | | O | O | | 1,00 | 1,23 | |
| 7 | O | | | | O | | 0,81 | 1,16 | |
| 8 | | O | | | O | | 0,70 | 1,12 | |
| 9 | | | O | | O | | 0,63 | | |
| R | O | | | | | O | -5,09 | | |

State transmissions:

$i_{0\,VS1} = -3,00$
$i_{0\,VS2} = -1,60$
$i_{0\,NS1} = -2,75$
$i_{0\,NS2} = -1,60$

| Path | Closed switching-element | | | | | | | Transmission | Level | Inclination |
|---|---|---|---|---|---|---|---|---|---|---|
| | A | B | D | E | M | H | L | | | |
| 1 | | O | O | | | | O | 6,90 | 1,73 | |
| 2 | | | (O) | | O | | O | 4,00 | 1,46 | |
| 3 | | O | O | | O | | | 2,74 | 1,44 | |
| 4 | O | | O | | O | | | 1,91 | 1,30 | |
| 5 | O | O | | | O | | | 1,47 | 1,23 | 11,0 |
| 6 | O | | | | O | | | 1,19 | 1,19 | |
| 7 | | | (O) | | O | O | | 1,00 | 1,15 | |
| 8 | O | | | O | | | | 0,87 | 1,13 | |
| 9 | O | O | | | | O | | 0,78 | 1,11 | |
| 10 | O | | | O | | O | | 0,70 | 1,10 | |
| 11 | | O | O | | | O | | 0,63 | | |
| R1 | O | O | | | | | O | -6,90 | | |
| R2 | O | | O | | | | O | -3,45 | | |
| R3 | | O | O | | | | O | -2,30 | | |

State transmissions:

$i_{0\,VS1} = -2,00$      $i_{0\,NS1} = -3,00$
$i_{0\,VS2} = -3,00$      $i_{0\,NS2} = -2,30$

| Path | Closed switching-element | | | | | | | Transmission | Level | Inclination |
|---|---|---|---|---|---|---|---|---|---|---|
| | A | B | C | D | M | H | L | | | |
| 1 | | O | | O | | | O | 6,90 | 1,73 | |
| 2 | | (O) | | | O | | O | 4,00 | 1,46 | |
| 3 | | O | | O | O | | | 2,74 | 1,44 | |
| 4 | | | O | O | O | | | 1,91 | 1,30 | |
| 5 | O | | | O | O | | | 1,47 | 1,23 | |
| 6 | O | | O | | O | | | 1,19 | 1,19 | 11,0 |
| 7 | (O) | | | | O | O | | 1,00 | 1,15 | |
| 8 | O | | O | | | | O | 0,87 | 1,13 | |
| 9 | O | | | O | | | O | 0,78 | 1,11 | |
| 10 | | | O | O | | | O | 0,70 | 1,10 | |
| 11 | | O | | O | | | O | 0,63 | | |
| R1 | O | | | O | | | O | -6,90 | | |
| R2 | O | | O | | | | O | -3,45 | | |
| R3 | O | O | | | | | O | -2,30 | | |

State transmissions:

$i_{0\,VS1} = -2,00$     $i_{0\,NS1} = -1,74$
$i_{0\,VS2} = -3,00$     $i_{0\,NS2} = -2,30$

| Path | Closed switching-element | | | | | Transmission | Level | Inclination |
|---|---|---|---|---|---|---|---|---|
| | A | B | M | H | L | | | |
| 1 |   | O |   |   | O | 6,00 | 1,86 | |
| 2 |   |   | O |   | O | 3,25 | 1,41 | |
| 3 |   | O | O |   |   | 2,17 | 1,65 | |
| 4 | O |   | O |   |   | 1,32 | 1,31 | 9,0 |
| 5 |   |   | O | O |   | 1,00 | 1,27 | |
| 6 | O |   |   | O |   | 0,82 | 1,26 | |
| 7 |   | O |   | O |   | 0,67 | | |
| R |   | O |   |   | O | -9,00 | | |

State transmissions:

$i_{0\,VS1} = -2,00$ $i_{0\,VS2} = -2,00$ $i_{0\,NS1} = -2,25$ $i_{0\,NS2} = -3,00$

| Path | Closed switching-element | | | | | | | Transmission | Level | Inclination |
|---|---|---|---|---|---|---|---|---|---|---|
| | A | B | C | D | E | M | H | | | |
| 1 | | O | | O | | O | | 3,13 | 1,20 | |
| 2 | | | O | O | | O | | 2,61 | 1,17 | |
| 3 | O | | | O | | O | | 2,24 | 1,15 | |
| 4 | O | | O | | | O | | 1,96 | 1,13 | |
| 5 | O | O | | | | O | | 1,74 | 1,11 | |
| 6 | O | | | | O | O | | 1,57 | 1,10 | |
| 7 | | O | | | O | O | | 1,42 | 1,09 | |
| 8 | | | O | | O | O | | 1,30 | 1,07 | 4,1 |
| 9 | | | | | (O) | O | O | 1,22 | 1,07 | |
| 10 | | | O | | | | O | 1,14 | 1,07 | |
| 11 | | O | | | | | O | 1,07 | 1,07 | |
| 12 | O | | | | | | O | 1,00 | 1,06 | |
| 13 | O | O | | | | | O | 0,94 | 1,06 | |
| 14 | O | | O | | | | O | 0,89 | 1,06 | |
| 15 | O | | | O | | | O | 0,84 | 1,05 | |
| 16 | | | O | O | | | O | 0,80 | 1,05 | |
| 17 | | O | | O | | | O | 0,76 | | |

State transmissions:

$i_{0\,VSa} = -1,75 = -\varnothing_{13a} / \varnothing_{11a}$     $i_{0\,VS1} = -4,00$ $i_{Planet\,g/Planet\,k} = 1,75 = \varnothing_{12ag} / \varnothing_{12ak}$     $i_{0\,VS2} = -2,00$ $i_{0\,VSa\,ges} = -1,00$     $i_{0\,NS1} = -3,50$ $i_{0\,NS2} = -1,60$

| Path | Closed switching-element | | | | | | | Transmission | Level | Inclination |
|---|---|---|---|---|---|---|---|---|---|---|
| | A | B | C | D | E | M | H | | | |
| 1 | | | O | | | O | O | 3,13 | 1,20 | |
| 2 | | | O | O | | O | | 2,61 | 1,17 | |
| 3 | O | | | O | | O | | 2,24 | 1,15 | |
| 4 | O | | O | | | O | | 1,96 | 1,13 | |
| 5 | O | O | | | | O | | 1,74 | 1,11 | |
| 6 | O | | | | O | O | | 1,57 | 1,10 | |
| 7 | | O | | | O | O | | 1,42 | 1,09 | |
| 8 | | | O | | O | O | | 1,30 | 1,07 | 4,1 |
| 9 | | (O) | | | | O | O | 1,22 | 1,07 | |
| 10 | | | O | O | | | O | 1,14 | 1,07 | |
| 11 | | O | | | O | | O | 1,07 | 1,07 | |
| 12 | O | | | O | | | O | 1,00 | 1,06 | |
| 13 | O | O | | | | | O | 0,94 | 1,06 | |
| 14 | O | | O | | | | O | 0,89 | 1,06 | |
| 15 | O | | | | O | | O | 0,84 | 1,05 | |
| 16 | | O | O | | | | O | 0,80 | 1,05 | |
| 17 | | O | | | O | | O | 0,76 | | |

State transmissions:

$i_{0VSa} = +2,00$    $i_{0NS1} = -3,50$ $i_{0VS1} = -1,50$    $i_{0NS2} = -1,60$ $i_{0VS2} = -2,00$

| Path | Closed switching-element | | | | | | | | Transmission | Level | Inclination |
|---|---|---|---|---|---|---|---|---|---|---|---|
| | A | B | C | D | E | M | H | L | | | |
| 1  |   |   | O |   | O |   |   | O | 5,50 | 1,25 | |
| 2  |   | O |   |   | O |   |   | O | 4,40 | 1,20 | |
| 3  | O | O |   |   |   |   |   | O | 3,66 | 1,17 | |
| 4  | O |   | O |   |   |   |   | O | 3,14 | 1,14 | |
| 5  | O |   |   | O |   |   |   | O | 2,75 | 1,12 | |
| 6  | O |   |   |   | O |   |   | O | 2,44 | 1,11 | |
| 7  |   |   | O | O |   |   |   | O | 2,20 | 1,10 | |
| 8  |   |   |   | (O) |   | O |   | O | 2,00 | 1,09 | |
| 9  |   |   | O | O |   | O |   |   | 1,83 | 1,09 | |
| 10 | O |   |   | O |   | O |   |   | 1,68 | 1,08 | |
| 11 | O |   | O |   |   | O |   |   | 1,56 | 1,07 | |
| 12 | O | O |   |   |   | O |   |   | 1,45 | 1,07 | 6,7 |
| 13 | O |   |   |   | O | O |   |   | 1,36 | 1,07 | |
| 14 |   | O |   |   | O | O |   |   | 1,28 | 1,06 | |
| 15 |   |   | O |   | O | O |   |   | 1,21 | 1,05 | |
| 16 |   |   |   | (O) | O | O | O |   | 1,15 | 1,05 | |
| 17 |   |   | O |   | O |   | O |   | 1,10 | 1,05 | |
| 18 |   | O |   |   | O |   | O |   | 1,05 | 1,05 | |
| 19 | O |   |   |   | O |   | O |   | 1,00 | 1,05 | |
| 20 | O | O |   |   |   |   | O |   | 0,96 | 1,05 | |
| 21 | O |   | O |   |   |   | O |   | 0,92 | 1,05 | |
| 22 | O |   |   | O |   |   | O |   | 0,88 | 1,05 | |
| 23 |   |   | O | O |   |   | O |   | 0,85 | 1,04 | |
| 24 |   | O |   | O |   |   | O |   | 0,82 | 1,04 | |

State transmissions:

$i_{0\,VSa} = +2,00$  $i_{0\,VS1} = -1,50$  $i_{0\,NS1} = -2,85$ $i_{0\,VS2} = -2,00$  $i_{0\,NS2} = -2,20$

Fig. 16B

| Path | Closed switching-element | | | | | | | | Transmission | Level | Inclination |
|---|---|---|---|---|---|---|---|---|---|---|---|
| | A | B | C | D | E | M | H | L | | | |
| 1  |   |   | O |   | O |   |   | O | 4,81 | 1,20 |     |
| 2  |   | O |   |   | O |   |   | O | 4,00 | 1,17 |     |
| 3  | O |   |   |   | O |   |   | O | 3,43 | 1,14 |     |
| 4  | O | O |   |   |   |   |   | O | 3,00 | 1,13 |     |
| 5  | O |   | O |   |   |   |   | O | 2,66 | 1,11 |     |
| 6  | O |   |   | O |   |   |   | O | 2,39 | 1,10 |     |
| 7  |   |   | O | O |   |   |   | O | 2,17 | 1,09 |     |
| 8  |   | O |   | O |   |   |   | O | 1,99 | 1,08 |     |
| 9  |   |   |   | (O) |  | O |   | O | 1,84 | 1,08 |     |
| 10 |   | O |   | O |   | O |   |   | 1,71 | 1,07 |     |
| 11 |   |   | O | O |   | O |   |   | 1,60 | 1,07 |     |
| 12 | O |   |   | O |   | O |   |   | 1,50 | 1,06 |     |
| 13 | O |   | O |   |   | O |   |   | 1,41 | 1,06 | 6, 0 |
| 14 | O | O |   |   |   | O |   |   | 1,33 | 1,06 |     |
| 15 | O |   |   |   | O | O |   |   | 1,26 | 1,05 |     |
| 16 |   | O |   |   | O | O |   |   | 1,20 | 1,05 |     |
| 17 |   |   | O |   | O | O |   |   | 1,14 | 1,05 |     |
| 18 |   |   |   |   | (O) | O | O |   | 1,09 | 1,05 |     |
| 19 |   |   | O |   | O |   | O |   | 1,04 | 1,04 |     |
| 20 |   | O |   |   | O |   | O |   | 1,00 | 1,04 |     |
| 21 | O |   |   |   | O |   | O |   | 0,96 | 1,04 |     |
| 22 | O | O |   |   |   |   | O |   | 0,92 | 1,04 |     |
| 23 | O |   | O |   |   |   | O |   | 0,89 | 1,04 |     |
| 24 | O |   |   | O |   |   | O |   | 0,86 | 1,04 |     |
| 25 |   |   | O | O |   |   | O |   | 0,83 | 1,03 |     |
| 26 |   | O |   | O |   |   | O |   | 0,80 |      |     |

Transmissions:

$i_{0\,V6a} = -1,70$  $\quad i_{0\,VS1} = -1,50$  $\quad i_{0\,NS1} = +3,21$ $i_{0\,V6b} = +2,00$  $\quad i_{0\,VS2} = -2,00$  $\quad i_{0\,NS2} = -2,57$ State transmissions:

$i_{0\,NS1'} = -2{,}27$
$i_{0\,NS2'} = -2{,}57$

State transmissions:

| Path | Closed switching-element | | | | | | | | | Transmission | Level | Inclination |
|---|---|---|---|---|---|---|---|---|---|---|---|---|
| | A | B | C | D | E | M | H | M' | H' | | | |
| 1 | | O | | O | | O | | O | | 6,26 | 1,20 | |
| 2 | | | O | O | | O | | O | | 5,22 | 1,17 | |
| 3 | O | | | O | | O | | O | | 4,48 | 1,15 | |
| 4 | O | | O | | | O | | O | | 3,92 | 1,13 | |
| 5 | O | O | | | | O | | O | | 3,48 | 1,11 | |
| 6 | O | | | | O | O | | O | | 3,14 | 1,10 | |
| 7 | | O | | | O | O | | O | | 2,84 | 1,09 | |
| 8 | | | O | | O | O | | O | | 2,60 | 1,07 | |
| 9 | | | | | (O) | O | O | O | | 2,44 | 1,07 | |
| 10 | | | O | | O | | O | O | | 2,28 | 1,07 | |
| 11 | | O | | | O | | O | O | | 2,14 | 1,07 | |
| 12 | O | | | | O | | O | O | | 2,00 | 1,06 | |
| 13 | O | O | | | | | O | O | | 1,88 | 1,06 | |
| 14 | O | | O | | | | O | O | | 1,78 | 1,06 | |
| 15 | O | | | O | | | O | O | | 1,68 | 1,05 | |
| 16 | | | O | O | | | O | O | | 1,60 | 1,05 | |
| 17 | | O | | O | | | O | O | | 1,52 | 1,06 | |
| 18 | | | | (O) | | | (O) | O | O | 1,44 | 1,08 | 9,6 |
| 19 | | O | | O | | | | O | O | 1,33 | 1,07 | |
| 20 | | | O | O | | | | O | O | 1,25 | 1,06 | |
| 21 | O | | | O | | | | O | O | 1,18 | 1,06 | |
| 22 | O | | O | | | | | O | O | 1,11 | 1,06 | |
| 23 | O | O | | | | | | O | O | 1,05 | 1,05 | |
| 24 | O | | | | O | | | O | O | 1,00 | 1,05 | |
| 25 | | O | | | O | | | O | O | 0,95 | 1,04 | |
| 26 | | | O | | O | | | O | O | 0,91 | 1,04 | |
| 27 | | | | (O) | | O | | O | O | 0,88 | 1,04 | |
| 28 | | | O | | O | O | | O | O | 0,84 | 1,04 | |
| 29 | | O | | | O | O | | O | O | 0,81 | 1,04 | |
| 30 | O | | | | O | O | | O | O | 0,78 | 1,04 | |
| 31 | O | O | | | | O | | O | O | 0,75 | 1,04 | |
| 32 | O | | O | | | O | | O | O | 0,72 | 1,04 | |
| 33 | O | | | O | | O | | O | O | 0,70 | 1,04 | |
| 34 | | | O | O | | O | | O | O | 0,67 | 1,03 | |
| 35 | | O | | O | | O | | O | O | 0,65 | | |

State transmissions:

$i_{0VSa} = +2{,}00$    $i_{0VS1} = -4{,}00$    $i_{0NS1} = -3{,}50$    $i_{0NS1'} = -2{,}27$ $i_{0VS2} = -2{,}00$    $i_{0NS2} = -1{,}60$    $i_{0NS2'} = -2{,}57$

MULTISTEP REDUCTION GEAR

FIELD OF THE INVENTION

The present invention relates to a multi-step reduction gear.

BACKGROUND OF THE INVENTION

The older German patent application P 199 49 507.4 by the applicant describes several gear patterns for an automatic multi-step reduction gear with various combinations of coupled planetary gear sets. Through the suitable connection of a non-shiftable front-mounted gear group combination to a shiftable rear-mounted gear group combination at least seven forward gears can be switched, respectively, without a multiple connection. The number of shiftable forward gears is hereby greater than the number of switch elements by a factor of at least two.

DE-P 199 49 507.4 suggests the development of the shiftable rear-mounted gear group combination as a two-planet carrier/four-shaft transmission with two shiftable rear-mounted planetary gear sets. A two-planet carrier/four-shaft transmission should be interpreted here as an arrangement of two individual mechanically coupled single carrier planetary gear sets where the coupled unit contains four so-called "free shafts" due to the double component connection feature, wherein a "shaft" can be a sun wheel, a ring gear or a planet carrier of a planetary gear set.

It is now the object of the present invention, proceeding from the known state-of-the-art, to develop further a multi-step reduction gear with at least seven forward gears that can be shifted without a multiple connection with comparatively little construction effort, unmodified favorable gear steps and large spread.

SUMMARY OF THE INVENTION

Proceeding on the state-of-the-art from DE-P 199 49 507.4, the multi-step reduction gear comprises a front-mounted gear group that is connected to the drive shaft and a rear-mounted gear group that is connected to the output shaft of the transmission.

In a first solution of the task pursuant to the invention, both the front-mounted group and the rear-mounted group are each designed as coupled, shiftable planetary gear sets and are connected with each other by means of a spacer shaft.

In a second solution to the task pursuant to the invention, the front-mounted group is formed by two front-mounted planetary gear sets that are independent of each other, of which at least one can be shifted, while the rear-mounted group is formed by coupled, shiftable planetary gear sets. "Independent" here should be interpreted so that each of the two front-mounted planetary gear sets generates a speed that is not influenced by an active connection between the two front-mounted planetary gear sets. The output speed of the front-mounted group here is therefore created either by the first or the second front-mounted planetary gear set, however, not by both simultaneously.

The shiftable rear-mounted group can always be connected to the drive shaft of the transmission by means of at least one switch element and is always firmly attached to the spacer shaft—i.e., the output of the shiftable front-mounted group.

Pursuant to the invention, by selectively switching the switch elements acting on the shiftable front-mounted group, a certain speed is generated on the output of the front-mounted group, at which the spacer shaft rotates.

In each gear that is engaged, at least two switch elements are switched. When changing from one gear to the next highest, only one switch element is disconnected and a further switch element is connected, thus avoiding multiple connections critical for shifting quality for which several switch elements would have to be connected or disconnected simultaneously.

The dependent claims reveal preferred designs of the invention, in which as many gears as possible can be shifted with the smallest possible number of switch elements and planetary gear sets, and a multi-step reduction gear can accordingly be produced inexpensively.

BRIEF DESCRIPTION OF THE DRAWINGS

The invention will now be described, by way of example, with reference to the accompanying drawings in which:

FIGS. 16A and 16B a sixteenth design of a multi-step reduction gear pursuant to the invention with twenty-six forward gears, without a reverse gear;

FIGS. 17E and 17F a seventeenth design of a multi-step reduction gear pursuant to the invention with thirty-five forward gears, without a reverse gear.

DETAILED DESCRIPTION OF THE INVENTION

Figures 1A, 1B:
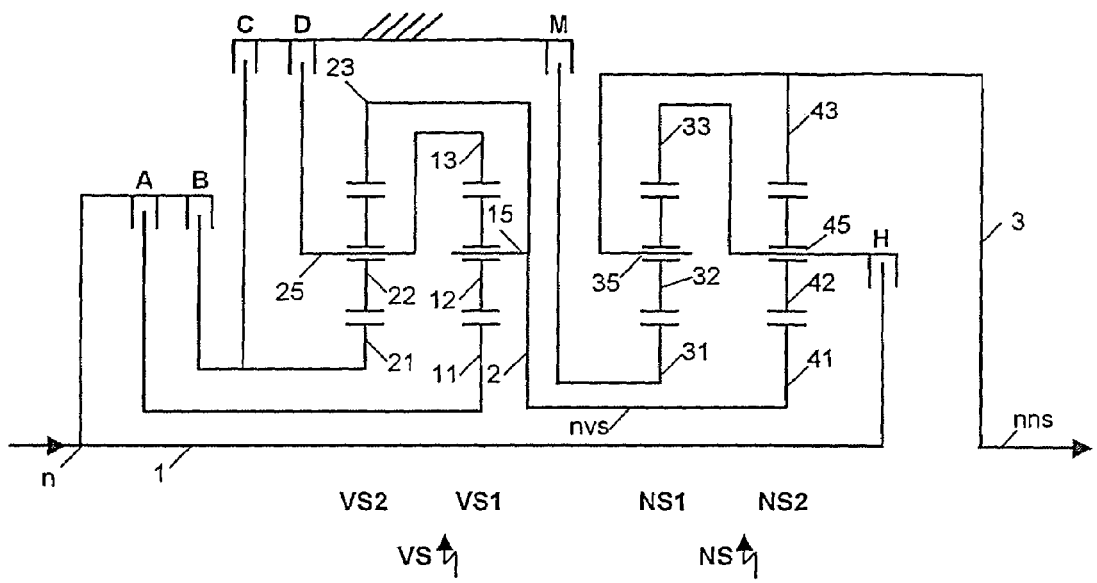
FIGS. 1A and 1B a first design of a multi-step reduction gear pursuant to the invention with nine forward gears and one reverse gear.

The Figures show, in accordance with the respective design of the multi-step reduction gear, the gear pattern (Figures Index A or C or E) as well as the shift logic with appropriate exemplary gear ratios of the individual gears, gear steps, gear spreads and gear (Figures Index B or D or F).

In order to create multi-step reduction gears with at least seven forward gears that can be produced comparatively inexpensively as compared to DE-P P 199 49 507.4, the front-mounted gear group combination is incorporated in a shiftable manner on the drive shaft of the transmission. This configuration generates another speed as a function of the actuated switch elements, wherein said speed acts on the likewise shiftable rear-mounted group combination on the output shaft of the transmission in addition to the input speed that is introduced by means of the drive shaft. In accordance with the actuation logic of the switch elements, the front-mounted group can optionally also be arranged in a block or be fixed.

In the multi-step reduction gear described above, a front-mounted group that is connected to the drive shaft creates two additional speeds that act on the rear-mounted group together with the input speed. In contrast to the present invention, these two speeds are generated by arranging two non-shiftable front-mounted planetary gear sets.

By actuating the switch elements in the present invention, the output speed of the front-mounted gear group combination and the input speed of the transmission are thus transmitted to the output shaft in accordance with the flow of power. Through the special configuration of the switch elements and planetary gear sets, various multi-step reduction gears, which are described in detail in the following, can be designed with at least seven forward gears, especially for passenger vehicles, busses and trucks. A multi-gear transmission without a reverse gear can be produced for use in motorcycles and bicycles.

The drive shaft 1 of the transmission and an output shaft 3 of the multi-step reduction gear are designated in all Figures. The multi-step reduction gear always comprises a shiftable front-mounted group VS and a shiftable rear-mounted group NS that is connected to the VS via a spacer shaft 2. The drive shaft 1 rotates at an input speed n. When two switch elements of the front-mounted group VS pursuant to the switch logic of the transmission are shifted, i.e., closed, the spacer shaft 2 rotates at an output speed nvs of the front-mounted group VS. The output shaft 3 rotates at an output speed nns of the rear-mounted group NS. In the following descriptions, VS1, VS2, VSa and VSb will mark a first, second, third, and fourth front-mounted planetary gear group, respectively, which are available depending on the design. Likewise, NS1, NS2, NS3 and NS4 will designate a first, second, third and fourth rear-mounted planetary gear group, respectively, which are available depending on the design. Depending on the design, up to five switch elements (clutches or brakes) A, B, C, D, and E acting on the front-mounted group can be provided, as well as up to five switch elements (clutches or brakes) M, H, L, M' and H' acting on the rear-mounted group.

The following describes six multi-step reduction gears pursuant to the invention by way of example with FIGS. 1A and 1B through 6A and 6B, which can be shifted by means of four switch elements A, B, C, D (FIGS. 1A, 1B and 3A, 3B) and/or four switch elements A, B, D, E (FIGS. 2A, 2B) or five switch elements A, B, C, D, E (FIGS. 4A, 4B through 6A, 6B) in the front-mounted group VS and two switch elements M, H in the rear-mounted group NS.

The front-mounted group VS is hereby designed as a shiftable two-planet carrier/four-shaft transmission with two coupled front-mounted planetary gear sets VS1 and VS2, wherein at least one free shaft of this two-planet carrier/four-shaft transmission can be connected to the drive shaft 1 by means of one of the switch elements A, B, C, D or E and at least one free shaft of this two-planet carrier/four-shaft transmission can be fixed by means of one further of the switch elements A through E. The speed nvs that is generated—depending on the actuated switch elements—on the output of the front-mounted group VS is rigidly transmitted to the rear-mounted group NS via the spacer shaft 2. The speed nvs can also be zero, i.e., the front-mounted group can be blocked against the gear housing. The speed nvs can also be equal to the input speed n of the drive shaft 1, i.e., the front-mounted group VS can also revolve as a block.

Not coupled in the front-mounted group VS are a spider gear of the first front-mounted planetary gear set VS1, wherein said gear is connected to the first switch element A, a spider gear of the second front-mounted planetary gear set VS2, wherein said gear is connected to the second and third switch elements B and C, as well as a planet carrier of the second front-mounted planetary gear set VS2 that is connected to the fourth switch element D and/or fifth switch element E and the spacer shaft 2 between the front-mounted and rear-mounted groups. Hereby a spider gear is defined as a sun wheel or a ring gear.

The shiftable rear-mounted group NS is also a shiftable two-planet carrier/four-shaft transmission that comprises the coupled rear-mounted planetary gear groups NS1 and NS2 and the switch elements M and H. Here, the rear-mounted group NS can be connected to the gear housing via its first switch element M and to the drive shaft 1 via its second switch element H.

Not coupled in the rear-mounted group NS are a spider gear of the first rear-mounted planetary gear set NS1, wherein said gear is connected to the switch element M designed as a brake, and a spider gear of the second rear-mounted planetary gear set NS2, wherein said gear is connected to the spacer shaft 2, as well as a shaft of the second rear-mounted planetary gear set NS2 that is connected to the switch element H and the output shaft 3. A spider gear can hereby be interpreted either as a sun wheel or a ring gear of the appropriate planetary gear group.

In the first six designs of the multi-step reduction gear pursuant to the invention in accordance with FIGS. 1 through 6, the gear ratios are always formed through the front-mounted and rear-mounted groups will, two switch elements being closed in the front-mounted group VS, respectively, and one switch element being closed in the rear-mounted group NS.

With regard to the speeds on the shafts and switch elements, the following applies to the first solution of the task pursuant to the invention and specifically to the first through sixth designs of the inventive multi-step reduction gear pursuant to FIGS. 1 through 6:

1. The speed on the drive shaft 1 and on the switch elements E and H is the same (input speed n);
2. the speed on the actuated switch element A is in the range from greater than/equal to zero to smaller than/equal to the input speed n of the drive shaft 1;
3. the speed on the actuated switch element D is greater than/equal to zero and smaller than the input speed n on the drive shaft 1;
4. the speed on the spider gear of the second rear-mounted planetary gear set NS2, wherein said gear is connected to the spacer shaft 2, is equal to/greater than one of the speeds nvs generated by the front-mounted groups VS in the case of actuated switch elements H and M;
5. the speed on the shaft, which connects the switch elements B and/or C to a spider gear of the second front-mounted planetary gear group VS2, is smaller than/equal to the speed generated with an actuated switch element B or C in the case of actuated switch elements A and D;
6. the speed on the shaft, which connects the switch elements B and/or C to the spider gear of the second front-mounted planetary gear set VS2, is greater than/equal to the speed generated with an actuated switch element B or C in the case of actuated switch elements A and E; and
7. the speed on the actuated switch element M is equal to zero.

The mechanical clutches of the front-mounted planetary gear group components are identical to each other in the first, fourth and sixth designs of an inventive multi-step reduction gear, respectively, as are the mechanical clutches of the rear-mounted planetary gear set components. The second and third designs of an inventive multi-step reduction gear are derived from the first design, each with a different clutch within the front-mounted group VS and the rear-mounted group NS. The fifth design of a multi-step reduction gear pursuant to the invention is derived from the fourth design, with a different clutch within the rear-mounted group NS, as well. Needless-to-say, other mechanical clutches of the planetary gear group components are also feasible in other further developments.

FIGS. 1A and 1B show by way of example a first design of an inventive multi-step reduction gear, with nine forward gears and one reverse gear. As depicted in FIG. 1A, this first design of the inventive multi-step reduction gear comprises two shiftable front-mounted planetary gear sets VS1 and VS2, which are coupled to a two-planet carrier/four-shaft transmission, and two shiftable rear-mounted planetary gear sets NS2 and NS2, which are likewise coupled to a two-planet carrier/four-shaft transmission.

The first shiftable front-mounted planetary gear set VS2 comprises a sun wheel 11, a planet carrier 15 with planetary gears 12 and a ring gear 13. Equivalent to said nomenclature, sun wheels are marked with 21, 31 and 41, planet carriers are designated 25, 35 and 45 comprising planetary gears 22, 32 and 42, and ring gears are marked with 23, 33 and 43 for the second front-mounted planetary gear set VS2, the first rear-mounted planetary gear group NS1 and the second rear-mounted planetary gear group NS2, respectively.

The drive shaft 1 (speed n) can be connected to the sun wheel 11 by means of a first clutch A of the front-mounted group VS, to the sun wheel 21 by means of a second clutch B of the front-mounted group VS and to the planet carrier 45 of the planetary gears 42 by means of a second clutch H of the rear-mounted group NS. The sun wheel 21 can be fixed through a third switch element C of the front-mounted group VS, wherein said element is designed as a brake. The planet carrier 25 with the planetary gears 22 is connected to the ring gear 13 and can be fixed through a fourth switch element D of the front-mounted group VS, wherein said element is designed as a brake. Moreover the ring gear 23 is connected to the planet carrier 15 of the planetary gears 12 and to the sun wheel 41 through the spacer shaft 2 (speed nvs). The sun wheel 31 can be fixed by means of a first switch element M of the rear-mounted group NS, wherein said element is designed as a brake. The planet carrier 45 with the planetary gears 42 is connected to the ring gear 33, and the planet carrier 35 with the planetary gears 32 is connected to the ring gear 43 and to the output shaft 3 (speed nns).

By selectively switching the overall six switch elements A, B, C, D, M and H, pursuant to the shift logic shown in FIG. 1B, a total of nine forward gears and one reverse gear R can be shifted.

As compared to equivalent gear designs pursuant to the aforementioned state-of-the-art, the multi-step reduction gear pursuant to the invention beneficially comprises a total of three brakes. Especially with regard to the compressed oil supply for actuating the switch elements, this results in a clearly more simplified design.

Figures 2A, 2B:
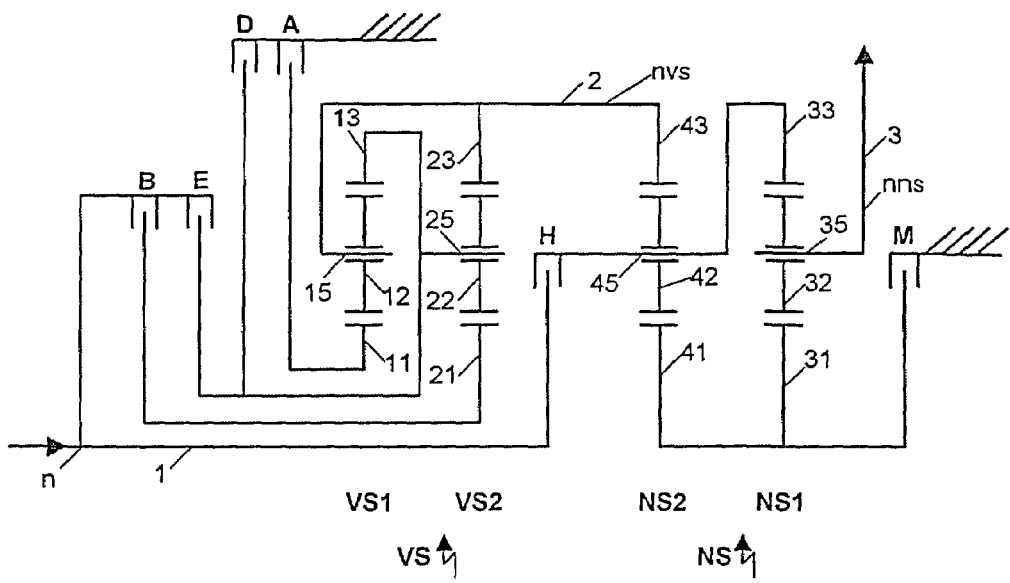
FIGS. 2A and 2B a second design of a multi-step reduction gear pursuant to the invention with nine forward gears and one reverse gear.

FIGS. 2A and 2B show by way of example a second design of an inventive multi-step reduction gear, with nine forward gears and one reverse gear. In the front-mounted group VS two shiftable, coupled front-mounted planetary gear sets VS1 and VS2 as well as four switch elements A, B, D and E are provided, in the rear-mounted group NS it is two shiftable, coupled rear-mounted planetary gear sets NS1 and NS2 as well as two switch elements M and H.

The first shiftable front-mounted planetary gear set VS1 here comprises a sun wheel 11, a planet carrier 15 with planetary gears 12 and a ring gear 13. Analogous to the preceding nomenclature, sun wheels are marked with 21, 31 and 41, planet carriers are designated 25, 35 and 45 comprising planetary gears 22, 32 and 42, and ring gears are marked with 23, 33 and 43 for the second front-mounted planetary gear set VS2, the first rear-mounted planetary gear group NS1 and the second rear-mounted planetary gear group NS2, respectively.

Compared to the previously described first design, the brake C provided there, which in the switched state always generates a speed of zero on the free shaft of the two-planet carrier/four-shaft transmission connected thereto, has been eliminated. The brake D thus forms the third switch element of the front-mounted group VS. A clutch E, which in the switched state always generates a speed that is equal to the input speed n of the drive shaft 1 on the free shaft of the two-planet carrier/four-shaft transmission connected thereto, is here provided as the fourth switch element.

As shown in FIG. 2A, the drive shaft 1 (speed n) can be connected to the sun wheel 21 through a second switch element B of the front-mounted group VS designed as a clutch and to the planet carrier 45 of the planetary gears 42 through a second clutch H of the rear-mounted group NS. The sun wheel 11 can be fixed through a first switch element A of the front-mounted group VS, wherein said element is designed as a brake. The planet carrier 25 with the planetary gears 22 is connected to the ring gear 13, can be fixed through the third switch element D designed as a brake, and can be connected to the drive shaft 1 through the fourth switch element E of the front-mounted group VS, wherein said element is designed as a clutch. The ring gear 23 is connected to the planet carrier 15 of the planetary gears 12 and via the spacer shaft 2 (speed nvs) to the ring gear 43. The sun wheels 31 and 41 are connected to each other and can be fixed through a first switch element M of the rear-mounted group NS that is designed as a brake. The planet carrier 45 with the planetary gears 42 is connected to the ring gear 33, and the planet carrier 35 of the planetary gears 32 is connected to the output shaft 3 (speed nns).

By selectively switching the overall six switch elements A, B, D, E, M and H, pursuant to the shift logic shown in FIG. 2B a total of nine forward gears and one reverse gear R can be shifted. Particularly due to the connection of the spacer shaft 2 to the ring gear 43 of the second rear-mounted planetary gear set NS2, due to the coupled sun wheels 31, 41 of the rear-mounted planetary gear sets NS1, NS2, wherein said wheels can be fixed by the brake M, and due to the output through the planet carrier 35 of the first rear-mounted planetary gear set NS1, the above-described second design of the inventive multi-step reduction gear is suited in particular for applications with an output that is arranged transversely to the driving axle, for example, for a motor vehicle with front-wheel drive and transverse driving motor. Another advantage of said second design is that with a switched first gear in the rear-mounted group NS no idle power arises.

Figures 3A, 3B:
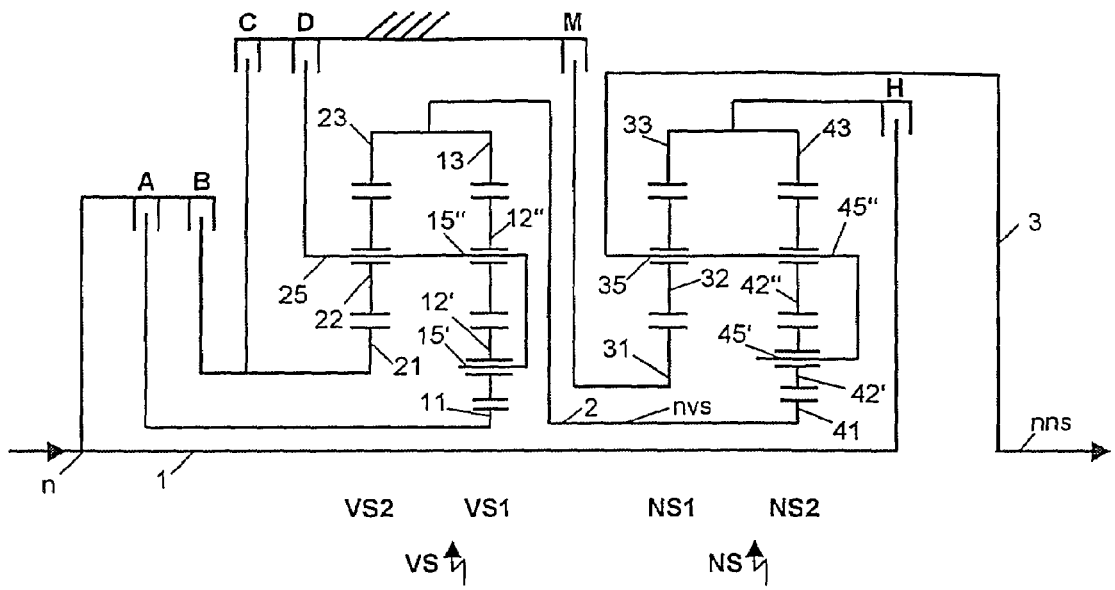
FIGS. 3A and 3B a third design of a multi-step reduction gear pursuant to the invention with nine forward gears and one reverse gear.

FIGS. 3A and 3B show by way of example a third design of an invented multi-step reduction gear, likewise with nine forward gears and one reverse gear, which is derived from the aforementioned first design. In the front-mounted group VS two shiftable, coupled front-mounted planetary gear sets VS1 and VS2, as well as four switch elements A, B, C and D are again provided; in the rear-mounted group NS it is two shiftable, coupled rear-mounted planetary gear sets NS1 and NS2, as well as two switch elements M and H.

The first shiftable front-mounted planetary gear set VS1 is designed here as a plus-transmission with double planetary gears and comprises a sun wheel 11, a ring gear 13, a planet carrier 15' with interior planetary gears 12', as well as a planet carrier 15" with exterior planetary gears 12", wherein both carriers 15' and 15" are connected to each other. The second shiftable front-mounted planetary gear group VS2 comprises a sun wheel 21, a ring gear 23 and a planet carrier 25 with planetary gears 22. The first rear-mounted group NS1 comprises a sun wheel 31, a ring gear 33 and a planet carrier 35 with planetary gears 32. The second rear-mounted group NS2 is designed as a plus-transmission with double planetary gears and comprises a sun wheel 41, a ring gear 33, a planet carrier 45' with interior planetary gears 42', as well as a planet carrier 45" with exterior planetary gears 42", wherein both planet carriers 45' and 45" are connected to each other.

As shown in FIG. 3A, the drive shaft 1 (speed n) can be connected to the sun wheel 11 through a first clutch A of the front-mounted group VS and to the sun wheel 21 through a second clutch B of the front-mounted group NS. Moreover, the drive shaft 1 can be connected to the coupled ring gears 33 and 43 by means of a second clutch H of the rear-mounted group NS. The sun wheel 21 can be fixed through a third switch element C of the front-mounted group VS, wherein said element is designed as a brake. The planet carrier 25 is connected to the coupled planet carriers 15" and 15' and can be fixed through a fourth switch element D of the front-mounted group VS that is designed as a brake. Furthermore, the ring gears 13 and 23 are coupled and connected to the sun wheel 41 by means of the spacer shaft 2 (speed nvs). The sun wheel 31 can be fixed through a first switch element M of the rear-mounted group NS that is designed as a brake. The coupled planet carriers 45" and 45' are connected to the planet carrier 35. The planet carrier 35 is in turn connected to the output shaft 3 (speed nns).

By selectively switching the overall six switch elements A, B, C, D, M and H pursuant to the shift logic shown in FIG. 3B, a total of nine forward gears and one reverse gear R can be shifted.

Figures 4A, 4B:
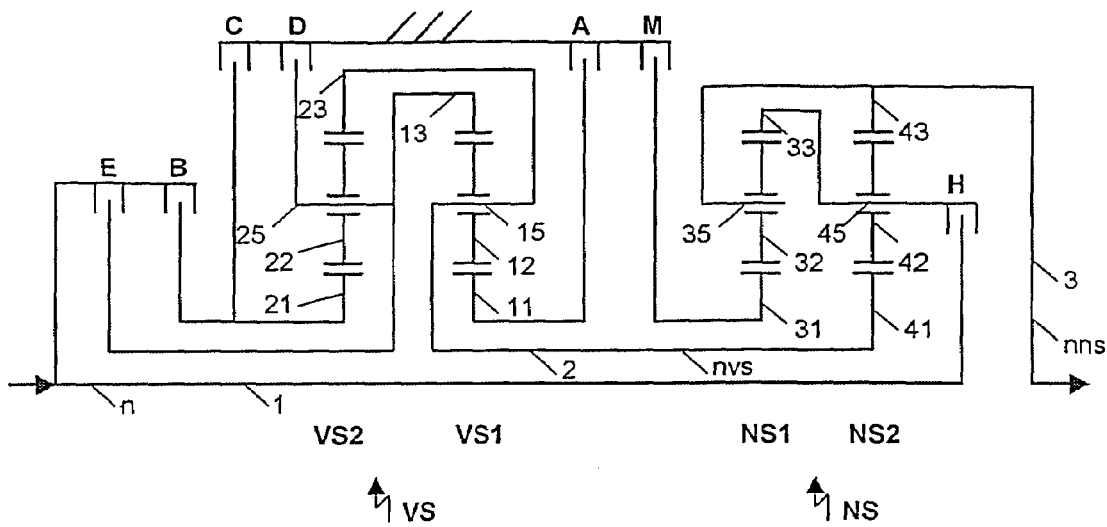
FIGS. 4A and 4B a fourth design of a multi-step reduction gear pursuant to the invention with eleven forward gears and one reverse gear.

The following describes by way of example a fourth design of the present invention based on FIGS. 4A and 4B. Details that were already explained in connection with FIG. 1A have been marked identically in FIG. 4A. Compared to the first through third designs, the fourth design pursuant to the invention comprises in the front-mounted group VS a fifth switch element E in addition to the four switch elements A through D, with two switch elements M and H remaining unchanged in the rear-mounted group NS. The coupling of the two front-mounted planetary gear groups VS1 and VS2 is identical to the first design, as is the coupling of the two rear-mounted planetary gear sets NS1 and NS2.

As described in FIG. 4A, the planet carrier 25 of the planetary gears 22 is connected to the ring gear 13 and can be connected to the drive shaft 1 (speed n) through a fifth clutch E of the front-mounted group VS and can be fixed with the brake D. The sun wheel 21 can be connected to the drive shaft 1 through the clutch B and can be fixed with the brake C. The sun wheel 11 can then be fixed through a first switch element of the front-mounted group A, wherein said element is designed as a brake. The planet carrier 15 is connected with the planetary gears 12 to the ring gear 23 and via the spacer shaft 2 (speed nvs) to the sun wheel 41. The planet carriers 45 are coupled with the planetary gears 42 to the ring gear 33 and can be connected to the drive shaft 1 via the clutch H. The sun wheel 31 can be fixed through the brake M. The planet carrier 35 is connected with the planetary gears 32 to the ring gear 43 and the output shaft 3 (speed nns).

By selectively switching the seven switch elements A through E, M and H pursuant to the shift logic shown in FIG. 4B, a total of eleven forward gears and one reverse gear R can be shifted. Beneficially, this fourth design of the inventive multi-step reduction gear with four wheel sets can be used to create more gears compared to the prior state-of-the-art, while simultaneously implementing a pressure supply to the switch elements (four brakes) with a simple design.

Based on FIGS. 5A and 5B now a fifth exemplary design of an inventive multi-step reduction gear will be explained which is derived from the fourth design. The front-mounted group VS, which is designed as a two-planet carrier/four-shaft transmission, again comprises five switch elements A, B, C, D and E, one shiftable first front-mounted planetary gear set VS1 with a sun wheel 11, a ring gear 13 and a planet carrier 15 with planetary gears 12, as well as one shiftable second front-mounted planetary gear set VS2 with a sun wheel 21, a ring gear 23 and a planet carrier 25 with planetary gears 22. The rear-mounted group NS, which is also designed as a two-planet carrier/four-shaft transmission, comprises two switch elements M and H, one shiftable first rear-mounted planetary gear set NS1 with a sun wheel 31, a ring gear 33 and a planet carrier 35 with planetary gears 32, as well as one shiftable second rear-mounted planetary gear set NS2 with a sun wheel 41, a ring gear 43 and a planet carrier 45 with planetary gears 42.

Indifference from the fourth design, this fifth design of an inventive multi-step reduction gear has been modified in its component coupling within the rear-mounted group NS. The ring gear 33 of the first rear-mounted planetary gear set NS1 and the planet carrier 45 of the second rear-mounted planetary gear set NS2 are coupled unchanged. Indifference from the fourth design, the sun wheels 31 and 41 of the two rear-mounted planetary gear sets NS1 and NS2 are now coupled; the mechanical connection to the front-mounted group VS takes place exclusively by means of the ring gear 43 of the second rear-mounted planetary gear set NS2 and the output of the rear-mounted group NS by means of the planet carrier 35 of the first rear-mounted planetary gear set NS1.

One further difference of the fifth design of a multi-step reduction gear pursuant to the invention results from designing the first switch element A of the front-mounted group VS as a clutch. The sun wheel 11 of the first front-mounted planetary gear group VS1 can now be connected to the drive shaft 1 and can no longer be fixed.

Figures 5A, 5B:
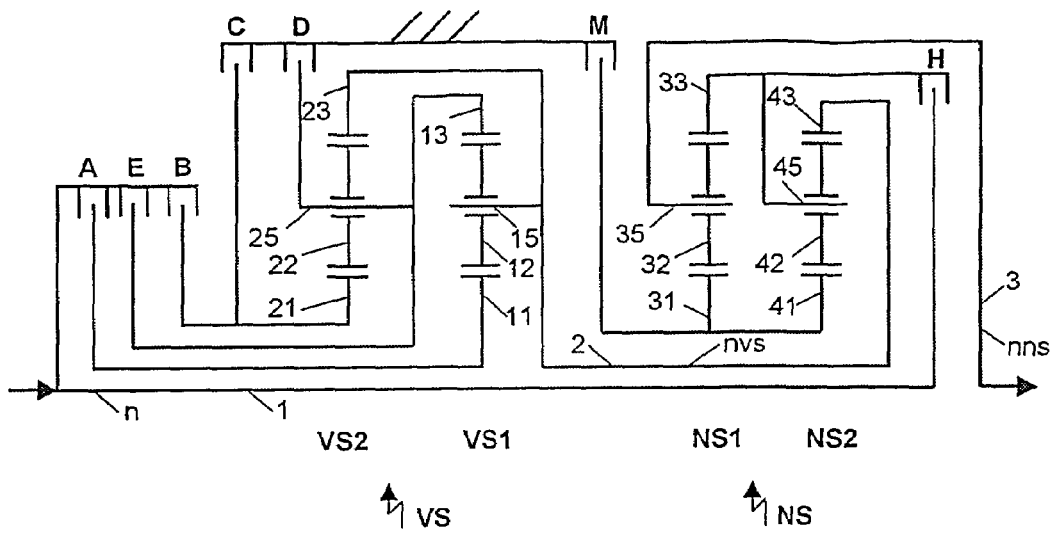
FIGS. 5A and 5B a fifth design of a multi-step reduction gear pursuant to the invention with eleven forward gears and one reverse gear.

As is shown in FIG. 5A, the ring gear 13 and the planet carrier 25 are connected to each other, can be fixed with the fourth switch element D of the front-mounted group VS and can be connected to the drive shaft 1 by means of the fifth switch element E of the front-mounted group VS. The ring gear 23 and the planet carrier 15 are connected to each other and via the spacer shaft 2 to the ring gear 43. The ring gear 33 and the planet carrier 45 are connected to each other and can be connected via the second switch element H of the rear-mounted group NS to the drive shaft 1. The planet carrier 35 is connected to the output shaft 3. The sun wheel 11 can be connected to the drive shaft 1 via the first switch element A of the front-mounted group VS. The sun wheel 21 can be connected to the drive shaft 1 via the second switch element B of the front-mounted group VS and can be fixed through the third switch element C of the front-mounted group VS. The sun wheels 31 and 41 are connected to each other and can be fixed by means of the first switch element M of the rear-mounted group NS.

As the switch logic pursuant to FIG. 5B shows, the selective shifting of the seven switch elements A through E, M and H allows a total of eleven forward gears and one reverse gear R to be shifted. As in the fourth design, this fifth design of the inventive multi-step reduction gear can also beneficially be used to generate more gears with four-wheel sets compared to the prior state-of-the-art.

Figures 6A, 6B:
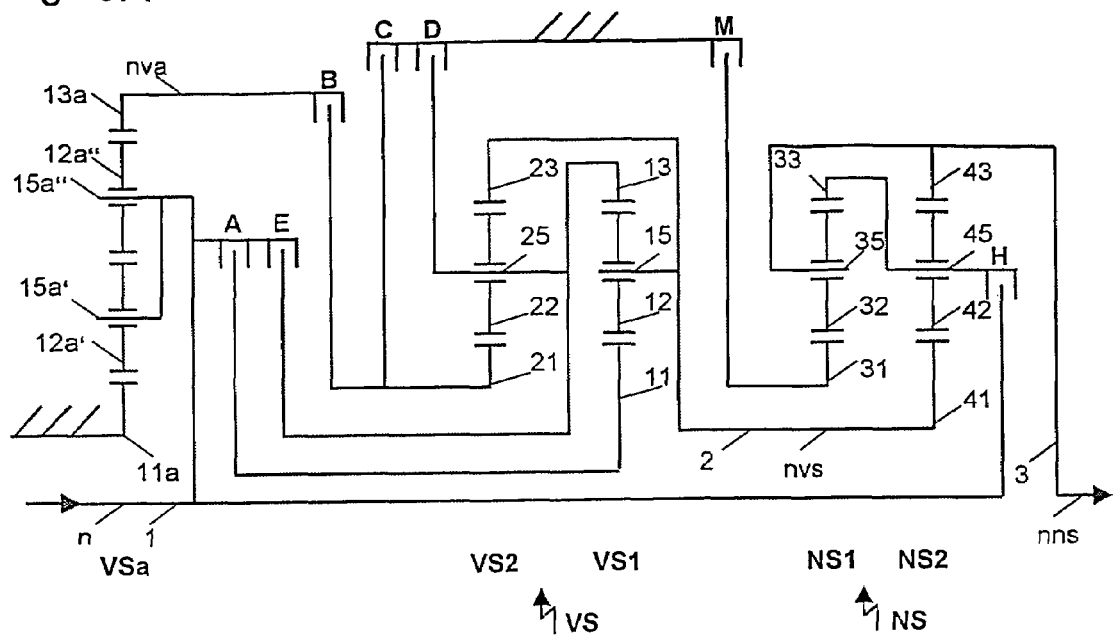
FIGS. 6A and 6B a sixth design of a multi-step reduction gear pursuant to the invention with fifteen forward gears and one reverse gear.

FIG. 6A shows by way of example a sixth design of the inventive multi-step reduction gear. In accordance with the switch logic depicted in FIG. 6B, a total of fifteen forward gears and one reverse gear can be shifted. The shiftable front-mounted planetary gear sets VS1 and VS2 as well as the shiftable rear-mounted planetary gear sets NS1 and NS2 are designed like the corresponding wheel sets of the first and fourth designs of the inventive multi-step reduction gear and are also coupled to each other in the same manner. Indifference from the fourth design, however, the sixth design comprises one additional non-shiftable front-mounted planetary gear group VSa, with an unchanged number of switch elements (five in the front-mounted group VS and two in the rear-mounted group NS, now four clutches and three brakes).

As depicted in FIG. 6A, the additional third—non-shiftable—front-mounted planetary gear set Vsa comprises a sun wheel 11*a*, a planet carrier 15*a*' with interior planetary gears 12*a*', a planet carrier 15*a*" with exterior planetary gears 12*a*", as well as a ring gear 13*a*. The sun wheel 11*a* is fixed (speed zero) hereby. The planet carrier 15*a*' of the interior planetary gears 12*a*' and the planet carrier 15*a*" of the exterior planetary gears 12*a*" are jointly connected to the drive shaft 1 (speed n). The ring gear 13*a* rotates at a speed nva.

The planet carrier 25 with the planetary gears 22 of the second shiftable front-mounted planetary gear group VS2 is connected to the ring gear 13 of the first shiftable front-mounted planetary gear group VS1, can be connected to the drive shaft 1 by means of the clutch E and can be fixed with the brake D. The sun wheel 21 of the second shiftable front-mounted planetary gear set VS2 can be connected via the clutch B to the ring gear 13*a* of the third front-mounted planetary gear set VSa and then rotates at a speed nva. Optionally, the sun wheel 21 can also be fixed by means of the brake C, wherein the clutch B and brake C pursuant to the shift logic depicted in FIG. 6B are never actuated simultaneously. The sun wheel 11 of the first shiftable front-mounted planetary gear set VS1 can be connected to the drive shaft 1 via the first switch element A of the front-mounted group VS, wherein said element is designed as a clutch. The planet carrier 15 with the planetary gears 12 of the first shiftable front-mounted planetary gear group VS1 is connected to the ring gear 23 of the second shiftable front-mounted planetary gear set VS2 and via the spacer shaft 2 (speed nvs) to the sun wheel 41 of the second rear-mounted planetary gear group NS2. The planet carrier 45 with the planetary gears 42 of the second rear-mounted planetary gear set NS2 is coupled to the ring gear 33 of the first rear-mounted planetary gear group NS1 and can be connected to the drive shaft 1 by means of the second clutch H of the rear-mounted group NS. The sun wheel 31 of the first rear-mounted planetary gear group NS1 can be fixed by means of the brake M of the rear-mounted group NS. The planet carrier 35 with the planetary gears 32 of the first rear-mounted planetary gear group NS1 is connected to the ring gear 43 of the second rear-mounted planetary gear group NS2 and to the output shaft 3 (speed nns).

The advantage compared to the aforementioned prior state-of-the-art is that with the multi-step reduction gear with five wheel sets and seven switch elements pursuant to the invention, more gears can be generated with comparatively identical design efforts.

In a further development of the sixth design of the multi-step reduction gear pursuant to the invention, it can be provided that the third front-mounted planetary gear group VSa is designed in a shiftable manner. The second switch element B of the front-mounted group VS here is not arranged between the ring gear 13*a* of the third front-mounted planetary gear set VSa and the sun wheel 21 of the second front-mounted planetary gear group VS2, but either between the drive shaft 1 and the coupled planet carriers 15*a*', 15*a*" of the third front-mounted planetary gear group VSa or as a brake on the sun wheel 11*a* of the third front-mounted planetary gear set VSa. The ring gear 13*a* and sun wheel 21 are then of course connected to each other.

Based on FIGS. 7A, 7B through 11A, 11B, further exemplary designs of an inventive multi-step reduction gear will now be described. Contrary to the aforementioned first six designs, in these further designs in addition to the second clutch H of the rear-mounted group NS a third switch element L of the rear-mounted group NS is connected to the planet carrier of the second rear-mounted planetary gear group NS2.

As with the first through sixth designs of a multi-step reduction gear pursuant to the invention, in these seventh, tenth and eleventh designs, two switch elements in the front-mounted group VS and one switch element as well in the rear-mounted group NS are closed for the gears that are formed through front-mounted and rear-mounted groups.

Apart from the speed conditions 1 through 6 already mentioned, the following conditions additionally apply:

8. the speed on the spider gear of the second rear-mounted planetary gear group NS2, wherein said gear is connected to the spacer shaft 2, is smaller than/equal to the speed nvs generated by the front-mounted group VS with shifted switch elements L and M;
9. the speed on the shifted switch element L is greater than/equal to zero and smaller than the input speed n of the drive shaft 1; and instead of the 7$^{th}$ speed condition, the following applies:

10. the speed on the shifted switch element M is greater than zero and smaller than/equal to the input speed n of the drive shaft 1.

The seventh and tenth exemplary inventive designs of a multi-step reduction gear each comprise identical mechanical component couplings within the front-mounted group VS and within the rear-mounted group NS. The eighth and ninth inventive designs each are derived from the seventh design, wherein different couplings within the front-mounted group VS and the rear-mounted group NS are incorporated. The eleventh invented design is derived from the tenth design, as well, with different couplings within the front-mounted group VS and the rear-mounted group NS. Of course, other mechanical couplings of the planetary gear set components can also be provided in other further developments.

Figures 7A, 7B:
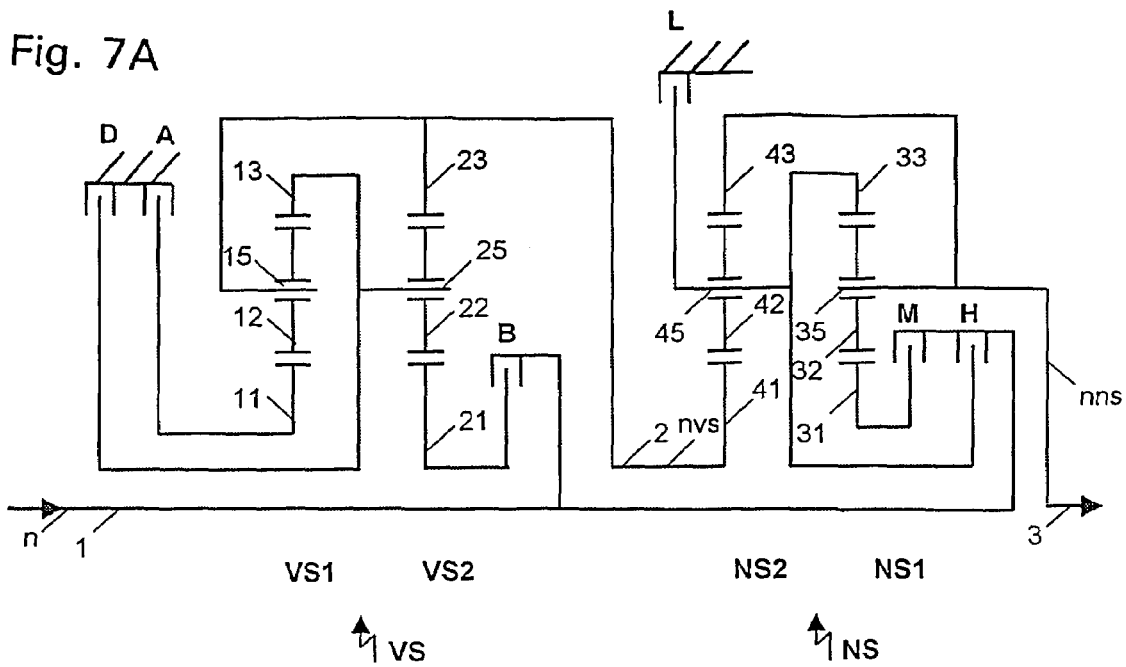
FIGS. 7A and 7B a seventh design of a multi-step reduction gear pursuant to the invention with nine forward gears and one reverse gear.

FIG. 7A now shows by way of example the gear pattern of a seventh design of an inventive multi-step reduction gear, comprising two shiftable front-mounted planetary gear groups VS1, VS2, which are coupled to a two-planet carrier/four-shaft transmission, and three switch elements A, B, D in the front-mounted group VS, as well as comprising two shiftable rear-mounted planetary gear groups NS1, NS2, which are coupled to a two-planet carrier/four-shaft transmission, and three switch elements M, H, L in the rear-mounted group NS. By selectively closing the six switch elements, the configuration from FIG. 7A allows the nine forward gears and one reverse gear as listed in the table in FIG. 7B to be shifted. Three of the forward gears here are designed as overdrive gears.

As shown in FIG. 7A, the drive shaft 1 (speed n) can hereby be coupled to the sun wheel 21 of the second shiftable front-mounted planetary gear set VS2 via the second clutch B of the front-mounted group VS, to the planet carrier 45 of the planetary gears 42 of the second rear-mounted planetary gear set NS2 via the second clutch H of the rear-mounted group NS, as well as to the sun wheel 31 of the first rear-mounted planetary gear set NS1 via the first clutch M of the rear-mounted group NS. The planet carrier 25 with the planetary gears 22 of the second shiftable front-mounted planetary gear set VS2 and the ring gear 13 of the first shiftable front-mounted planetary gear set VS1 are coupled and can be fixed by means of the third switch element D of the front-mounted group VS, wherein said element is designed as a brake. The sun wheel 11 of the first shiftable front-mounted planetary gear set VS1 can be fixed by means of the first switch element A of the front-mounted group VS, wherein said element is designed as a brake. The planet carrier 15 with the planetary gears 12 of the first shiftable front-mounted planetary gear set VS1 is connected to the ring gear 23 of the second shiftable front-mounted planetary gear set VS2 and connected to the sun wheel 41 of the second rear-mounted planetary gear group NS2 via the spacer shaft 2 (speed nvs). The planet carrier 45 with the planetary gears 42 of the second shiftable rear-mounted planetary gear set NS2 is coupled to the ring gear 33 of the first rear-mounted planetary gear set NS1 and can be fixed by means of the third switch element L of the rear-mounted group NS, wherein said element is designed as a brake. The planet carrier 35 with the planetary gears 32 of the first rear-mounted planetary gear set NS1 is connected to the ring gear 43 of the second rear-mounted planetary gear set NS2 and connected to the drive shaft 3 (speed nns).

Contrary to the aforementioned prior state-of-the-art, the seventh design of an inventive multi-step reduction gear depicted in FIGS. 7A, 7B has the same advantage as the first design pursuant to FIGS. 1A and 1B. Compared to the first design, the gear step configuration of the seventh design is more advantageous.

Figures 7C, 7D:
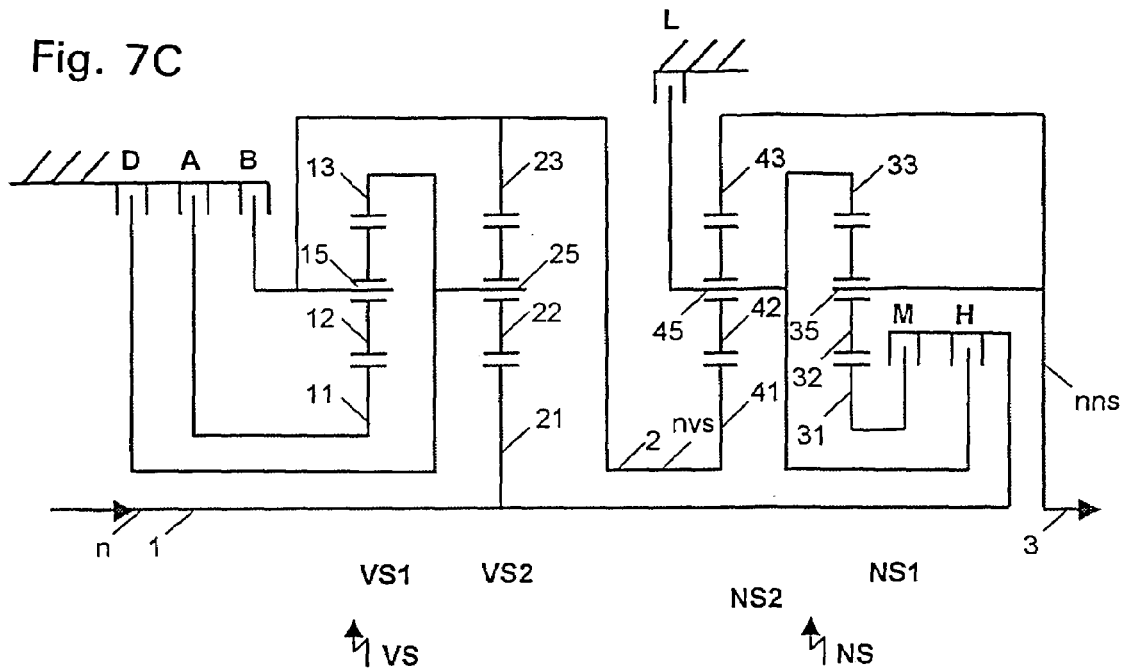
FIGS. 7C and 7D a further development of the seventh design of a multi-step reduction gear pursuant to the invention.

A further development of the seventh design of an inventive multi-step reduction gear suggests designing the second switch element B of the shiftable front-mounted group VS as a brake connected it to the spacer shaft 2. The appropriate gear pattern is depicted in FIG. 7C. Here the brake B is connected to the planet carrier 15 of the first front-mounted planetary gear set VS1 and therefore simultaneously to the ring gear 23 of the second front-mounted planetary gear set VS2, as well as with the spacer shaft 2. The sun wheel 21 of the second front-mounted planetary gear set VS2 is connected to the drive shaft 1.

Apart from that, the diagrammatic transmission design corresponds to that of the fourth design. Thus, four of the total of six switch elements are beneficially designed as brakes, with the familiar design advantages regarding their compressed oil supply.

FIG. 7D shows the shift logic of this further development of the seventh design of an inventive multi-step reduction gear. As with the seventh design, nine forward gears and one reverse gear can be shifted.

Figures 8A, 8B:
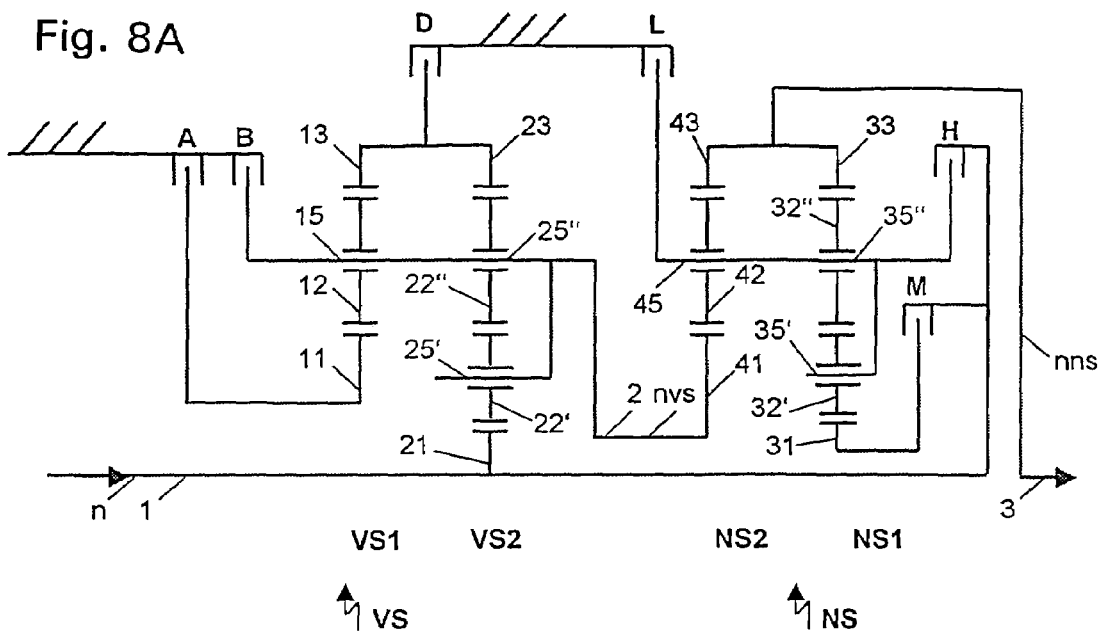
FIGS. 8A and 8B an eighth design of a multi-step reduction gear pursuant to the invention with nine forward gears and one reverse gear.

In FIGS. 8A and 8B an eighth exemplary design of an inventive multi-step reduction gear is explained, which is derived from the seventh design and comprises three switch elements A, B, D and two shiftable front-mounted planetary gear sets VS1, VS2 in the front-mounted group VS, as well as three switch elements M, H, L and two shiftable rear-mounted planetary gear sets NS1, NS2 in the rear-mounted group. Contrary to the seventh design described above in FIG. 7A, all three switch elements A, B, D of the front-mounted group VS are now designed as brakes and the component coupling within the front-mounted group VS and within the rear-mounted group NS has been modified. The second shiftable front-mounted planetary gear set VS2 and the first shiftable rear-mounted planetary gear set NS1 are now designed as plus-transmissions. The output of the front-mounted group VS (speed nvs) remains unchanged and is connected rigidly to a spider gear of the rear-mounted group NS via the spacer shaft 2, as is the case in the seventh design with the sun wheel 41 of the second rear-mounted planetary gear set NS2.

As shown in FIG. 8A, the first shiftable front-mounted planetary gear set VS1 comprises a sun wheel 11, a ring gear 13 and a planet carrier 15 with planetary gears 12. The second shiftable front-mounted planetary gear set VS2 is designed as a double-planetary gear set and comprises a sun wheel 21, a ring gear 23 and two coupled planet carriers 25', 25" with interior and exterior planetary gears 22', 22". The sun wheel 11 can be fixed by means of the brake A. The sun wheel 21 is connected to the drive shaft 1. The ring gears 13 and 23 are connected to each other and can be fixed by means of the brake D. The planet carriers 15, 25', 25" are connected to one another and can be fixed with the brake B. Moreover, the coupled planet carriers 15, 25', 25" form the output of the front-mounted group VS (speed nvs) and are connected firmly to a sun wheel 41 of the second rear-mounted planetary gear set NS2 via the spacer shaft 2. The first rear-mounted planetary gear set NS1 is designed as a double-planetary gear set and comprises a sun wheel 31, a ring gear 33 and two coupled planet carriers 35', 35" with interior and exterior planetary gears 32', 32". The second rear-mounted planetary gear set NS2 comprises the sun wheel 41, a ring gear 43 and a planet carrier 45 with planetary gears 42. The sun wheel 31 can be connected to the drive shaft 1 by means of the first switch element M of the rear-mounted group NS, wherein said element is designed as a clutch. The planet carriers 35', 35" and 45 are connected to one another, can be connected to the drive shaft 1 via the second switch element H of the rear-mounted group NS designed as a clutch, and can be fixed by means of the third switch element L of the rear-mounted group NS designed as a brake. The ring gears 33 and 43 are connected to each other and simultaneously form the output of the rear-mounted group NS (speed nns), and are thus connected to the output shaft 3.

As with the seventh design, also in the eighth design of an inventive multi-step reduction gear described above a total of nine forward gears and one reverse gear can be shifted without multiple connections by selectively shifting the six switch elements A, B, D and M, H, L, as depicted in FIG. 8B.

Figures 9A, 9B:
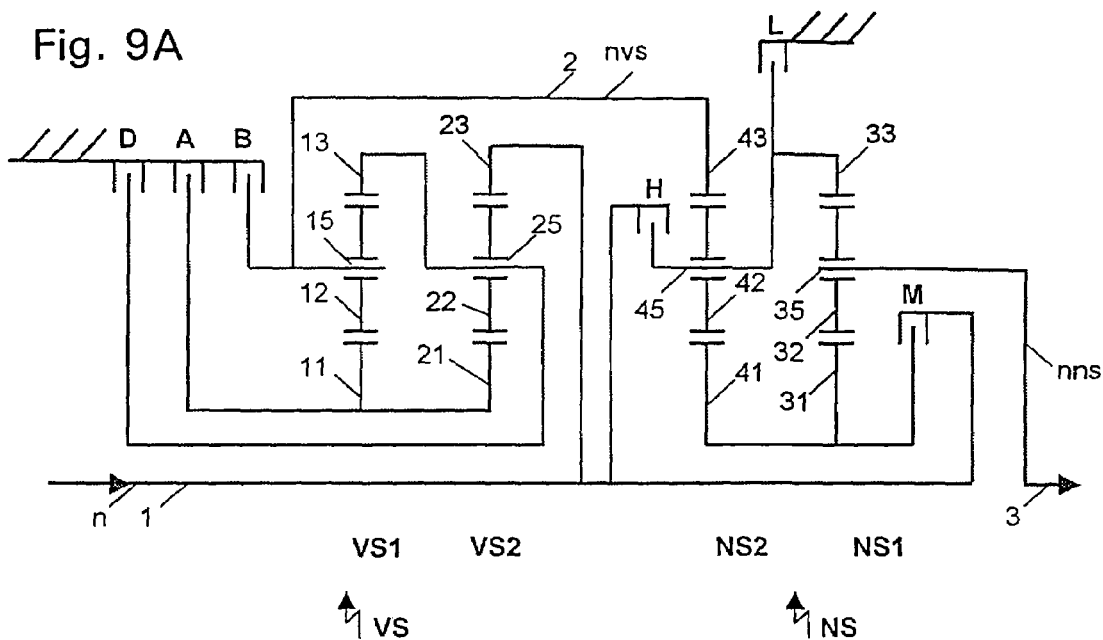
FIGS. 9A and 9B a ninth design of a multi-step reduction gear pursuant to the invention with nine forward gears and one reverse gear.

In FIGS. 9A and 9B a ninth exemplary design of an inventive multi-step reduction gear is explained, which is likewise derived from the seventh design and comprises three switch elements A, B, D and two shiftable front-mounted planetary gear sets VS1, VS2 in the front-mounted group VS, as well as three switch elements M, H, L and two shiftable rear-mounted planetary gear sets NS1, NS2 in the rear-mounted group. Contrary to the seventh design described previously in FIG. 7A, all three switch elements A, B, D of the front-mounted group VS are designed as brakes and the component coupling has been modified within the front-mounted group VS and within the rear-mounted group NS. The output of the front-mounted group VS (speed nvs) remains unchanged and is connected rigidly to a spider gear of the rear-mounted group NS via the spacer shaft 2, differently from the seventh design, however, with the ring gear 43 of the second rear-mounted planetary gear set NS2.

As shown in FIG. 9A, the first shiftable front-mounted planetary gear set VS1 comprises a sun wheel 11, a ring gear 13 and a planet carrier 15 with planetary gears 12. The second shiftable front-mounted planetary gear set VS2 comprises a sun wheel 21, a ring gear 23 and a planet carrier 25 with planetary gears 22. The sun wheels 11 and 21 are connected to each other and can be fixed by means of the brake A. The ring gear 23 is connected to the drive shaft 1. The ring gear 13 and the planet carrier 25 are connected to each other and can be fixed by means of the brake D. The planet carrier 15 can be fixed with the brake B. Moreover, the planet carrier 15 forms the output of the front-mounted group VS (speed nvs) and is connected firmly to a ring gear 43 of the second rear-mounted planetary gear set NS2 via the spacer shaft 2. The first rear-mounted planetary gear set NS1 comprises a sun wheel 31, a ring gear 33 and a planet carrier 35 with planetary gears 32. The second rear-mounted planetary gear set NS2 comprises a sun wheel 41, the ring gear 43 and a planet carrier 45 with planetary gears 42. The sun wheels 31 and 41 are connected to each other and can be connected to the drive shaft 1 by means of the first switch element M of the rear-mounted group NS, wherein said element is designed as a clutch. The ring gear 33 and the planet carrier 45 are connected to each other, can be connected to the drive shaft 1 via the second switch element H of the rear-mounted group NS designed as a clutch, and can be fixed by means of the third switch element L of the rear-mounted group NS designed as a brake. The planet carrier 35 forms the output of the rear-mounted group NS (speed nns), and is thus connected to the output shaft 3.

As in the seventh design, as well as in the ninth design of an inventive multi-step reduction gear described above, a total of nine forward gears and one reverse gear can be shifted without multiple connection by selectively shifting the six switch elements A, B, D and M, H, L pursuant to the shift logic depicted in FIG. 9B. Herein, as is also the case with the designs described in FIGS. 7C and 8A, only two switch elements are closed in each shifted gear. Compared to the seventh design, the spread is slightly enlarged and the component coupling of the rear-mounted group NS is more favorable in the first gear with regard to idle power.

Figures 10A, 10B:
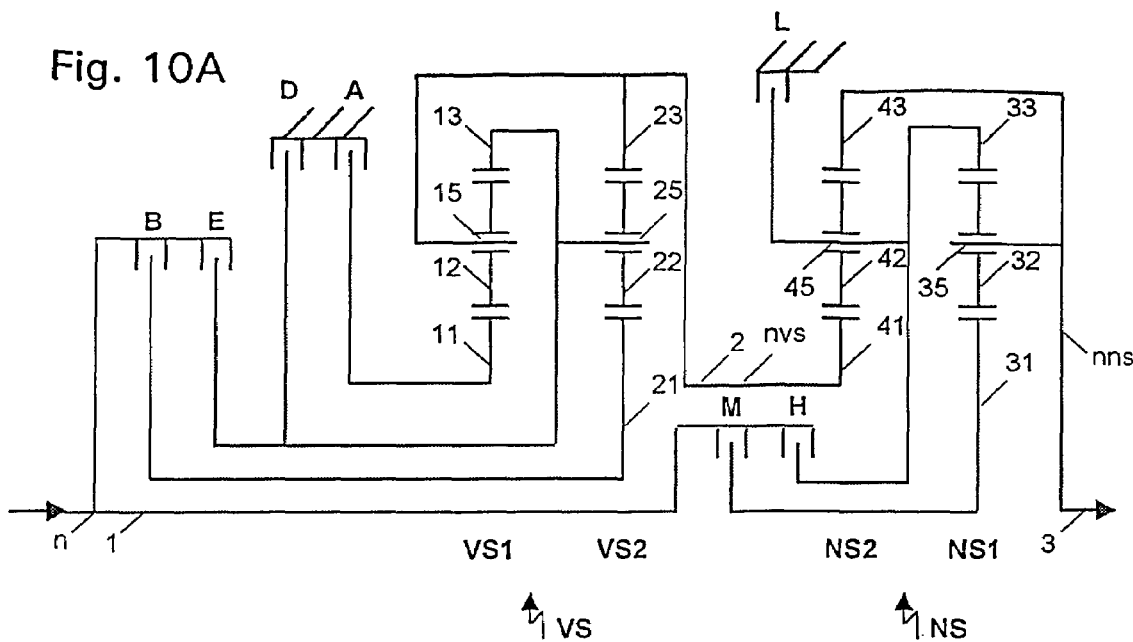
FIGS. 10A and 10B a tenth design of a multi-step reduction gear pursuant to the invention with eleven forward gears and three reverse gears.

An exemplary tenth design of an inventive multi-step reduction gear described pursuant to FIG. 10A comprises, compared to the seventh, eighth and ninth designs, a fourth switch element E, which is designed as a clutch, in the front-mounted group VS. By selectively shifting the seven switch elements A, B, D, E and H, M, L, a total of eleven forward gears and three reverse gears can be shifted pursuant to the shift logic depicted in FIG. 10B.

As shown in FIG. 10A, the first and third switch elements A, D of the front-mounted group VS are designed as brakes, the second and fourth switch elements B, E of the front-mounted group VS as clutches. The first and the second switch elements M, H of the rear-mounted group NS are clutches, the third switch element L of the rear-mounted group NS is a brake.

The drive shaft 1 (speed n) can hereby be connected to the sun wheel 21 of the second shiftable front-mounted planetary gear set VS2 via the clutch B, to the planet carrier 45 of the planetary gears 42 of the second rear-mounted planetary gear set NS2 via the clutch H, to the sun wheel 31 of the first rear-mounted planetary gear set NS1 via the clutch M, as well as to the planet carrier 25 of the planetary gears 22 of the second shiftable front-mounted planetary gear set VS2 via the clutch E. The planet carrier 25 are coupled with the planetary gears 22 of the second shiftable front-mounted planetary gear set VS2 and the ring gear 13 of the first shiftable front-mounted planetary gear set VS1 and can be fixed by means of the brake D. The sun wheel 11 of the first shiftable front-mounted planetary gear set VS1 can be fixed by means of the brake A.

The planet carrier 15 with the planetary gears 12 of the first shiftable front-mounted planetary gear set VS1 is connected to the ring gear 23 of the second shiftable front-mounted planetary gear group VS2 and via the spacer shaft 2 (speed nvs) to the sun wheel 41 of the second rear-mounted planetary gear set NS2. The planet carrier 45 with the planetary gears 42 of the second rear-mounted planetary gear set NS1 is coupled to the ring gear 33 of the first rear-mounted planetary gear set NS1 and can be fixed by means of the brake L. The planet carrier 35 with the planetary gears 32 of the first rear-mounted planetary gear group NS1 is connected to the ring gear 43 of the second rear-mounted planetary gear group NS2 and to the output shaft 3 (speed nns).

It is beneficial compared to the described prior state-of-the-art that more gears can be produced with four wheel sets through the inventive multi-step reduction gear pursuant to FIGS. 10A, 10B. Compared to the fourth and fifth designs of the inventive multi-step reduction gear, up to three reverse gears can be shifted beneficially. A special reverse gear, which is "longer" compared to the "normal" reverse gear, can be included, for example, in a winter driving program for the automatic transmission. An additional reverse gear that is "shorter" compared to the "normal" reverse gear is favorable, for example, for off-road vehicles or for a trailer operation of the vehicle.

Figures 11A, 11B:
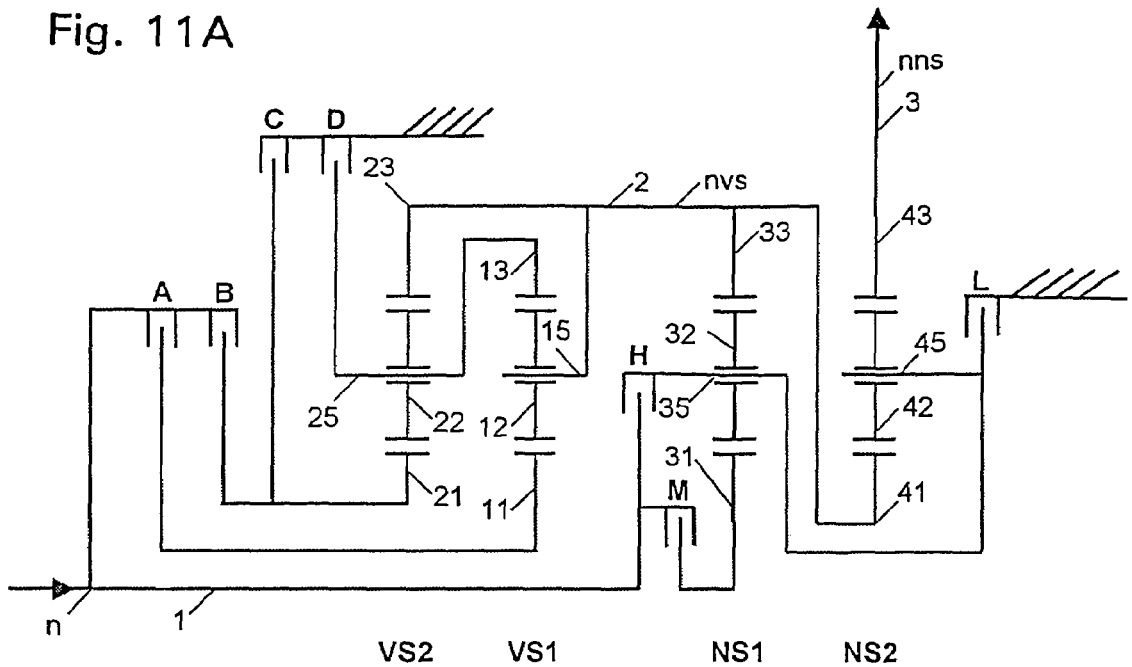
FIGS. 11A and 11B an eleventh design of a multi-step reduction gear pursuant to the invention with eleven forward gears and three reverse gears.

FIGS. 11A and 11B explain an eleventh exemplary design of an inventive multi-step reduction gear, which is derived from the tenth design. In the front-mounted group VS four switch elements A, B, C, D and two coupled, shiftable front-mounted planetary gear sets VS1 and VS2 are again provided, as well as three switch elements M, H, L and two coupled, shiftable rear-mounted planetary gear sets NS1 and NS2 in the rear-mounted group. Indifference from the above-described tenth design, the first switch element A of the front-mounted group VS is now a clutch, and the fourth switch element D of the front-mounted group VS is a brake. For reasons of consistent nomenclature, the third and fourth switch elements in the eleventh design have been marked C and D since the designation "E" thus far, as well as in the following designs of multi-step reduction gears pursuant to the invention, has been and is used for a clutch. Further differences from the tenth design relate to the component coupling within the front-mounted group VS and within the rear-mounted group NS.

As shown in FIG. 11A, the sun wheel 11 of the first front-mounted planetary gear set VS1 can be connected to the drive shaft 1 via the first switch element A of the front-mounted group VS, wherein said element is designed as a clutch. The sun wheel 21 of the second front-mounted planetary gear set VS2 can be connected to the drive shaft 1 via the second switch element B of the front-mounted group VS, wherein said element is designed as a clutch, and can be fixed through the third switch element C of the front-mounted group VS designed as a brake. The ring gear 13 of the first front-mounted planetary gear set VS1 and the planet carrier 25 of the second front-mounted planetary gear set VS2 are connected to each other and can be fixed by means of the fourth switch element D of the front-mounted group VS designed as a brake. The ring gear 23 of the second front-mounted planetary gear set VS2 and the planet carrier 15 of the first front-mounted planetary gear set VS1 are connected to each other to form the output of the front-mounted group VS, and are connected by means of the spacer shaft 2 (speed nvs) to the sun wheel 41 of the second rear-mounted planetary gear set NS2 and the ring gear 33 of the first rear-mounted planetary gear set NS1, wherein said gear is coupled to said sun wheel 41. The sun wheel 31 of the first rear-mounted planetary gear set NS1 can be connected to the drive shaft 1 via the first switch element M of the rear-mounted group NS, wherein said element is designed as a clutch. The planet carriers 35, 45 of the planetary gears 32, 43 of both rear-mounted planetary gear sets NS1, NS2 are connected to each other, can be connected to the drive shaft 1 by means of the second switch element H of the rear-mounted group NS, wherein said element is designed as a clutch, and can be fixed with the third switch element L of the rear-mounted group NS designed as a brake. The ring gear 43 of the second rear-mounted planetary gear set NS2 forms the output of the rear-mounted group NS and is connected to the output shaft 3.

As is shown in the shift logic depicted in FIG. 11A, in the described eleventh design of a multi-step reduction gear pursuant to the invention—just as with the tenth design—a total of eleven forward gears and three reverse gears can be shifted without multiple connection by selectively shifting the switch elements A, B, C, D, M, H, L, with harmonious gear steps and large spread.

In a twelfth design of an inventive multi-step reduction gear it is suggested, by way of example for the second solution of the task pursuant to the invention, to form the front-mounted group VS from two shiftable front-mounted planetary gear sets VS1 and VS2, which are independent from each other, i.e., not coupled, which is different from the coupled front-mounted planetary gear sets pursuant to the designs one through eleven explained above. On the output side, the front-mounted group VS of the twelfth design is unchanged and is connected to the spacer shaft 2.

Figures 12A, 12B:
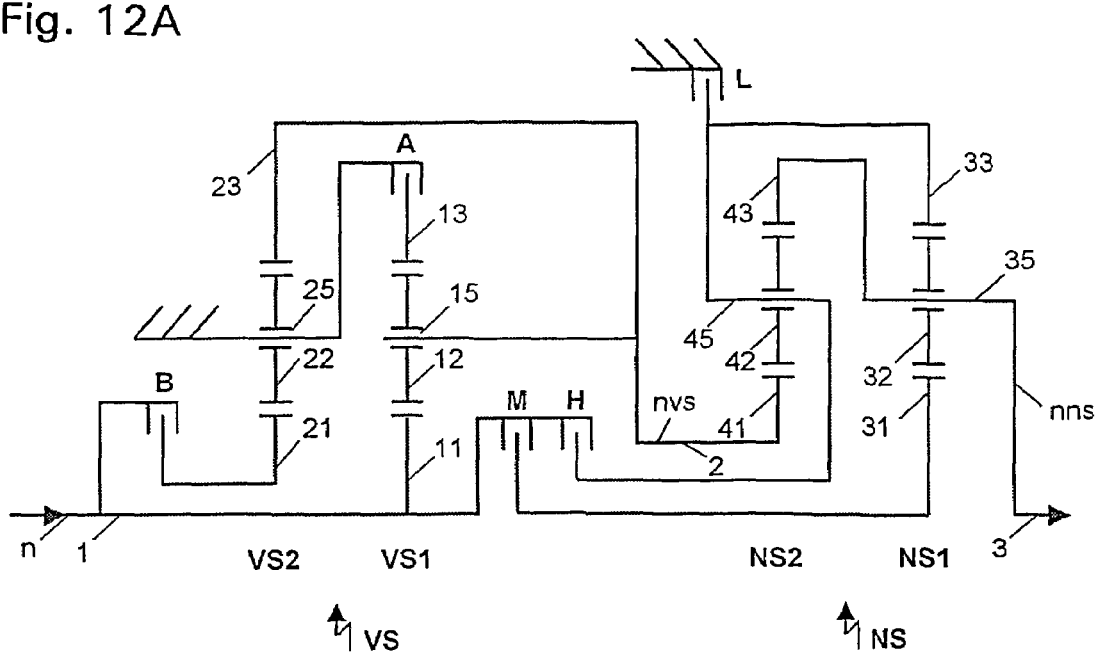
FIGS. 12A and 12B a twelfth design of a multi-step reduction gear pursuant to the invention with seven forward gears and one reverse gear (pursuant to the second solution of the invention)

FIG. 12A then shows the gear pattern of the twelfth design of an inventive multi-step reduction gear. Overall, five switch elements are provided: the brake A, and clutch B in the front-mounted group VS, as well as the clutch M, clutch H and brake L in the rear-mounted group NS. The sun wheel 11 of the first shiftable front-mounted planetary gear set VS1 is connected directly to the drive shaft 1 (speed n). The sun wheel 21 of the second shiftable front-mounted planetary gear set VS2 can be connected to the drive shaft 1 through the clutch B. The drive shaft 1 can be connected to the sun wheel 31 of the first rear-mounted planetary gear set NS1 via the clutch M and to the planet carrier 45 of the second rear-mounted planetary gear set NS2 via the clutch H. The planet carrier 25 is firmly connected to the housing with the planetary gears 22 of the second shiftable front-mounted planetary gear set VS2, i.e., it is fixed. The ring gear 13 of the first shiftable front-mounted planetary gear set VS2 can be fixed by means of the brake planet carrier 25 of the second front-mounted planetary gear set VS2. The planet carrier 15 of the first shiftable front-mounted planetary gear set VS1 and the ring gear 23 of the second front-mounted planetary gear set VS2 are coupled to each other and connected to the sun wheel 41 of the second rear-mounted planetary gear set NS2 by means of the spacer shaft 2 (speed nvs). The planet carrier 45 of the second rear-mounted planetary gear set NS2 is coupled to the ring gear 33 of the first rear-mounted planetary gear set NS1 and can be fixed by means of the brake L. The ring gear 43 of the second rear-mounted planetary gear set NS2 is connected to the planet carrier 35 of the first rear-mounted planetary gear set NS1 and to the output shaft 2 (speed nvs).

By selectively shifting the five switch elements A, B and H, M and L, pursuant to the shift logic shown in FIG. 12B, a total of seven forward gears and one reverse gear can be shifted. The output speed nvs of the front-mounted group VS is hereby generated by closing only one switch element (A or B) of the front-mounted group VS.

Compared to the aforementioned prior state-of-the-art, the twelfth design of the inventive multi-step reduction gear beneficially comprises two brakes as switch elements, the compressed oil or fluid supply of which can be designed in a simple manner for actuation purposes and therefore cost-effectively.

The following describes further designs of an inventive multi-step reduction gear that are designed without a shiftable reverse gear and that are suited especially for bicycles, motorcycles and multi-gear special purpose vehicles.

Herewith in the forward gears, which are formed with front-mounted and rear-mounted groups, two switch elements in the front-mounted group VS and one switch element in the rear-mounted group NS are closed, respectively. In the forward gears, which are formed only with the rear-mounted group NS, a maximum of one switch element of the next higher or next lower gear is always closed in the front-mounted group VS.

Figures 13A, 13B:
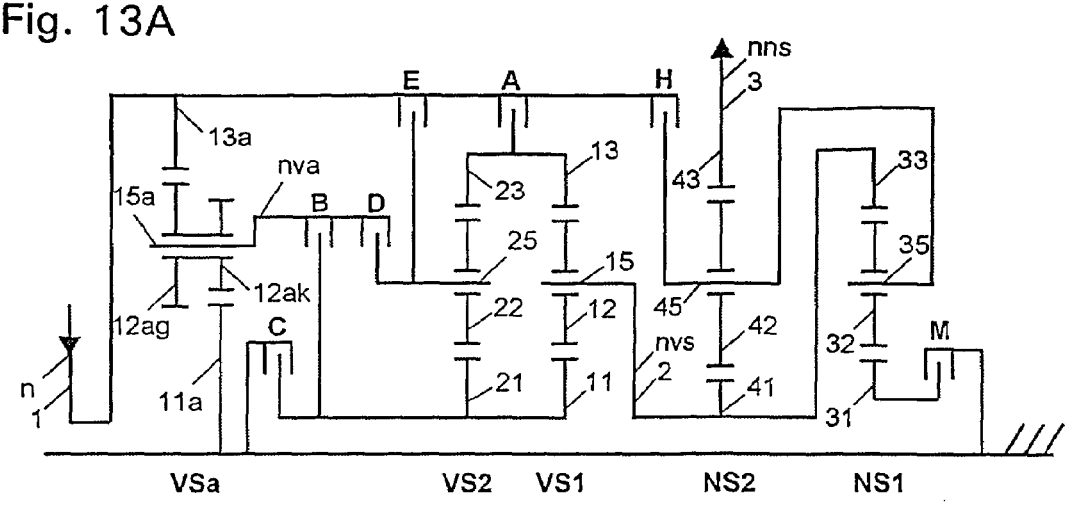
FIGS. 13A and 13B a thirteenth design of a multi-step reduction gear pursuant to the invention with seventeen forward gears, without a reverse gear.

FIG. 13A now shows by way of example a thirteenth design of an inventive multi-step reduction gear, which with regard to the number of wheel sets and switch elements in the front-mounted and rear-mounted groups is comparable to the sixth design of an inventive multi-step reduction gear described above. In this thirteenth design, however, the smallest speed on the spacer shaft 2, i.e., the output speed nvs of the front-mounted group, is always positive with a positive input speed n.

As is shown in FIG. 13A, the front-mounted group VS comprises two coupled, shiftable front-mounted planetary gear sets VS1 and VS2, a third, non-shiftable front-mounted planetary gear set VSA, as well as four clutches A, B, D, E and one brake C, the shiftable rear-mounted group NS comprises two coupled rear-mounted planetary gear sets NS1 and NS2, as well as one brake M and one clutch H. The front-mounted group VS and rear-mounted group NS are connected to each other by means of the spacer shaft 2.

The drive shaft 1 (speed n) is connected to the ring gear 13a of the third front-mounted planetary gear set VSA, as well as to the planet carrier 25 of the planetary gears 22 of the second shiftable front-mounted planetary gear set VS2 via the clutch E, to the ring gear 13 of the first shiftable front-mounted planetary gear set VS1 via the clutch A and to the planet carrier 45 of the planetary gears 42 of the second rear-mounted planetary gear set NS2 via the clutch H. The planetary gears 12a of the third front-mounted planetary gear set VSA are designed as stepped planetary gear systems with small planet gears 12ak and large planet gears 12ag. The planet carrier 15a (speed nva) with the planet gears 12ak and 12ag of the third front-mounted planetary gear group VSA can be connected to the sun wheel 21 of the second shiftable front-mounted planetary gear set VS2 by means of the clutch B and to the planet carrier 25 of the planetary gears 22 of the second shiftable front-mounted planetary gear set VS2 by means of the clutch D. The ring gear 13a of the third front-mounted planetary gear set VSA engages the large planet gears 12ag of the third front-mounted planetary gear set VSA. The sun wheel 11a of the third front-mounted planetary gear set VSA is fixed and engages with the small planet gears 12ak of the third front-mounted planetary gear set VSA. The sun wheel 21 of the second shiftable front-mounted planetary gear set VS2 is connected to the sun wheel 11 of the first shiftable front-mounted planetary gear set VS1 and can be fixed by means of the brake C. The ring gear 13 of the first shiftable front-mounted planetary gear set VS1 is connected to the ring gear 23 of the second shiftable front-mounted planetary gear set VS2. The planet carrier 15 with the planetary gears 12 of the first shiftable front-mounted planetary gear set VS1 is connected to the sun wheel 41 of the second rear-mounted planetary gear set NS2 by means of the spacer shaft 2 (speed nvs) and to the ring gear 33 of the first rear-mounted planetary gear set NS1. The planet carrier 45 with the planetary gears 42 of the second rear-mounted planetary gear set NS2 are coupled with the planet carrier 35 with the planetary gears 35 of the first rear-mounted planetary gear set NS1, i.e., connected to each other. The sun wheel 31 of the first rear-mounted planetary gear set NS1 can be fixed by means of the brake M. The ring gear 43 of the second rear-mounted planetary gear set NS2 is connected to the output shaft 3 (speed nns).

By selectively switching the seven switch elements A through E, H and M—pursuant to the shift logic shown in FIG. 13B—a total of seventeen forward gears can be shifted without multiple connection. A reverse gear is not provided. The advantage over the prior state-of-the-art is that the seventeen forward gears are realized with one less switch element and one less wheel set.

Figures 14A, 14B:
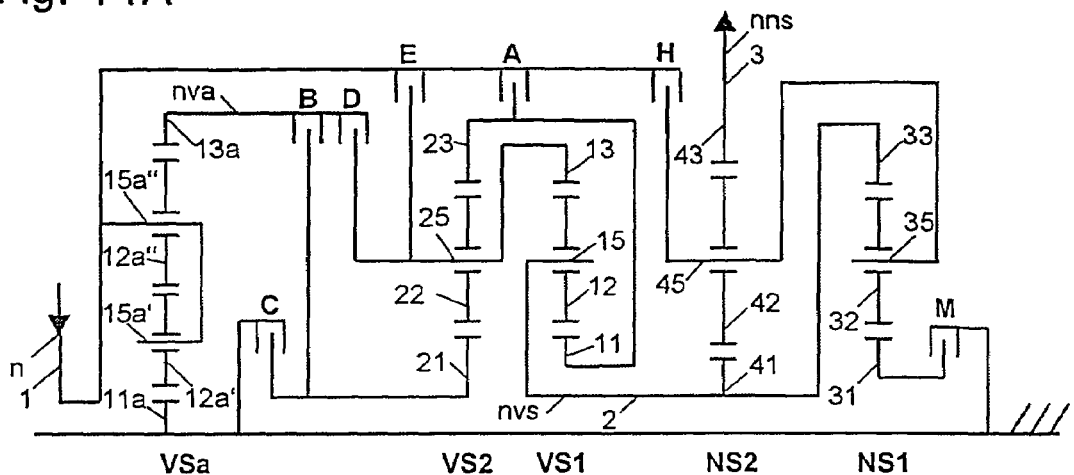
FIGS. 14A and 14B a fourteenth design of a multi-step reduction gear pursuant to the invention with seventeen forward gears, without a reverse gear.

In FIGS. 14A and 14B, an exemplary fourteenth design of an inventive multi-step reduction gear is explained, which is derived from the thirteenth design. The design of the rear-mounted group NS, for example, is identical, as are the type and number of switch elements in the front-mounted group and the number of wheel sets in the front-mounted group VS. The number of gears that can be shifted without multiple connections is also accordingly identical, as can be seen from the shift logic in FIG. 14B. The component coupling within the first and second front-mounted planetary gear sets VS1 and VS2 has been modified, as has the design of the third, non-shiftable front-mounted planetary gear set VSa.

As shown in FIG. 14A, the non-shiftable third front-mounted planetary gear set VSA is now implemented as a plus-transmission in double-planet design and comprises a sun wheel 11a, a ring gear 13a and two coupled planet carriers 15a', 15a" with interior and exterior planet gears 12a', 12a". The sun wheel 11a is fixed. The coupled planet carriers 15a', 15a" are connected to the drive shaft 1. The ring gear 13a can be connected to the sun wheel 21 of the second front-mounted planetary gear set VS2 by means of the second switch element B of the front-mounted group VS, wherein said element is designed as a clutch. Moreover, the ring gear 13a can be connected to the planet carrier 25 of the second front-mounted planetary gear set VS2 by means of the fourth switch element D of the front-mounted group VS, wherein said element is designed as a clutch. Said planet carrier 25 in turn is connected to the ring gear 13 of the first front-mounted planetary gear set VS1 and can be connected to the drive shaft 1 by means of the fifth switch element E of the front-mounted group VS designed as a clutch. The sun wheel 21 can also be fixed with the third switch element C of the front-mounted group VS designed as a brake. The ring gear 23 of the second front-mounted planetary gear set VS2 is coupled to the sun wheel 11 of the first front-mounted planetary gear set VS1 and can be connected by means of the first switch element A of the front-mounted group VS designed as a clutch. The planet carrier 15 of the first front-mounted planetary gear set VS1 forms the output of the front-mounted group VS and is connected to the spacer shaft 2 (speed nvs). On the rear-mounted group side, the spacer shaft 2 is connected to the sun wheel 41 of the second rear-mounted planetary gear set NS2 and the ring gear 33 of the first rear-mounted planetary gear set NS1, i.e., coupled to said sun wheel 41. The planet carriers 35 and 45 of the two rear-mounted planetary gear sets NS1 and NS2 are coupled and can be connected to the drive shaft 1 by means of the second switch element H of the rear-mounted group NS designed as a clutch. The sun wheel 31 of the first rear-mounted planetary gear set NS1 can be fixed with the first switch element M of the rear-mounted group NS, wherein said element is designed as a brake. The ring gear 43 of the second rear-mounted planetary gear set NS2 forms the output of the rear-mounted group NS (speed nns) and is connected to the output shaft 3.

Similar to the thirteenth design, the fourteenth design of a multi-step reduction gear pursuant to the invention described above is also particularly suited for a vehicle or bicycle application with input and output arranged transversely in the direction of travel, but also for a driving device with output that is arranged transversely to the input.

Figures 15A, 15B:
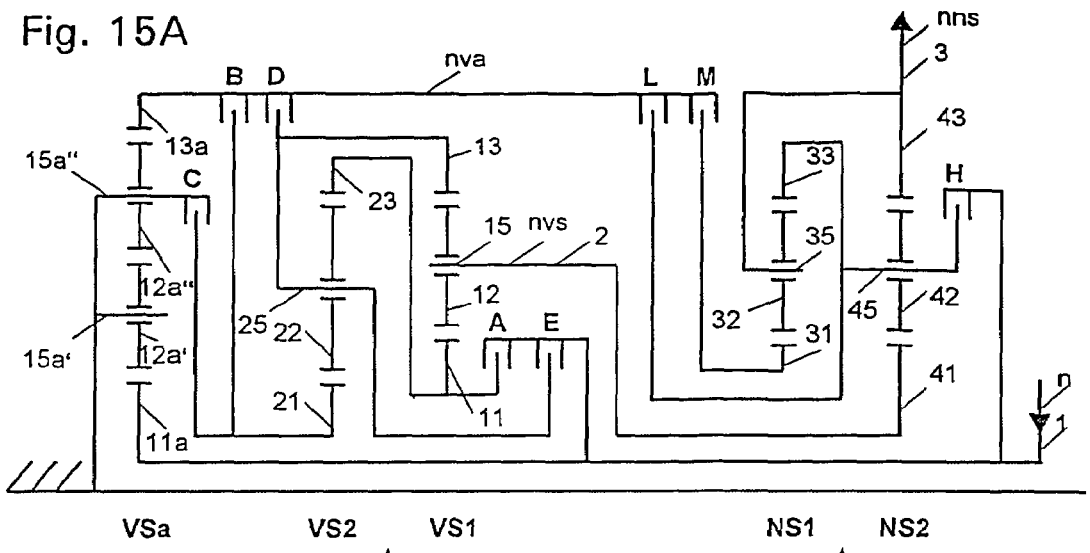
FIGS. 15A and 15B a fifteenth design of a multi-step reduction gear pursuant to the invention with twenty-four forward gears, without a reverse gear.

FIG. 15A shows, by way of example, a fifteenth design of a multi-step reduction gear pursuant to the invention, which with regard to the number of switch elements in the rear-mounted group NS is comparable to the seventh through eleventh designs of the inventive multi-step reduction gear. Overall, eight switch elements are provided, of which seven are clutches and one is a brake, as well as five planetary gear sets. The shiftable front-mounted group VS comprises two coupled, shiftable front-mounted planetary gear sets VS1 and VS2, a third, non-shiftable front-mounted planetary gear set VSa, four clutches A, B, D and E, and as a brake C. The third front-mounted planetary gear set VSA here takes on a double-planetary wheel design, with interior planetary gears 12$a'$ and exterior planetary gears 12$a''$ and accordingly two planet carriers 15$a'$ and 15$a''$. The shiftable rear-mounted group NS comprises two coupled rear-mounted planetary gear groups NS1, NS2 as well as three clutches M, H, L. The front-mounted group VS and rear-mounted group NS are connected to each other by means of the spacer shaft 2.

The drive shaft 1 (speed n) is hereby connected to the sun wheel 11$a$ of the third front-mounted planetary gear set VSA, as well as to the sun wheel 11 of the first shiftable front-mounted planetary gear set VS1 via the clutch A, to the planet carrier 25 of the planetary gears 22 of the second shiftable front-mounted planetary gear set VS2 via the clutch E and to the planet carrier 45 of the planetary gears 42 of the second rear-mounted planetary gear set NS2 via the clutch H. The planet carrier 15$a'$ of the interior planetary gears 12$a'$ of the third front-mounted planetary gear group VSA and the planet carrier 15$a''$ of the exterior planetary gears 12$a''$ of the third front-mounted planetary gear group VSA are coupled and fixed. The sun wheel 21 of the second shiftable front-mounted planetary gear set VS2 can be fixed by means of the brake C with the planet carrier 15$a''$ of the exterior planet gears 12$a''$ of the third front-mounted planetary gear set VSA. The ring gear 13$a$ (speed nva) of the third front-mounted planetary gear set VSA can be connected to the sun wheel 21 of the second shiftable front-mounted planetary gear set VS2 by means of the clutch B, to the planet carrier 25 of the planetary gears 22 of the second shiftable front-mounted planetary gear set VS2 by means of the clutch D, to the planet carrier 45 of the planetary gears 42 of the second rear-mounted planetary gear set NS2 by means of the clutch L and to the sun wheel 31 of the first rear-mounted planetary gear set NS1 by means of the clutch M. The planet carrier 25 with the planetary gears 22 of the second shiftable front-mounted planetary gear set VS2 and the ring gear 13 of the first shiftable front-mounted planetary gear set VS1 are coupled with each other. The sun wheel 11 of the first shiftable front-mounted planetary gear set VS1 and the ring gear 23 of the second shiftable front-mounted planetary gear set VS2 are likewise coupled to each other. The planet carrier 15 (speed nvs) with the planet gears 12 of the first shiftable front-mounted planetary gear set VS1 is connected to the sun wheel 41 of the second rear-mounted planetary gear set NS2 via the spacer shaft 2. The planet carrier 45 with the planet gears 42 of the second rear-mounted planetary gear set NS2 is connected to the ring gear 33 of the first rear-mounted planetary gear set NS1. The planet carrier 35 with the planet gears 32 of the first rear-mounted planetary gear set NS1 is connected to the ring gear 43 of the second rear-mounted planetary gear set NS2 and to the output shaft 3 (speed nns).

By selectively switching the eight switch elements A through E and H, M and L, pursuant to the shift logic shown in FIG. 15B, a total of twenty-four forward gears can be shifted. A reverse gear is not provided. The advantage of this fifteenth design of an inventive multi-step reduction gear over the aforementioned prior state-of-the-art is that overall, twenty-four instead of seventeen forward gears are realized with the same number of switch elements and one less wheel set.

Figure 16A:
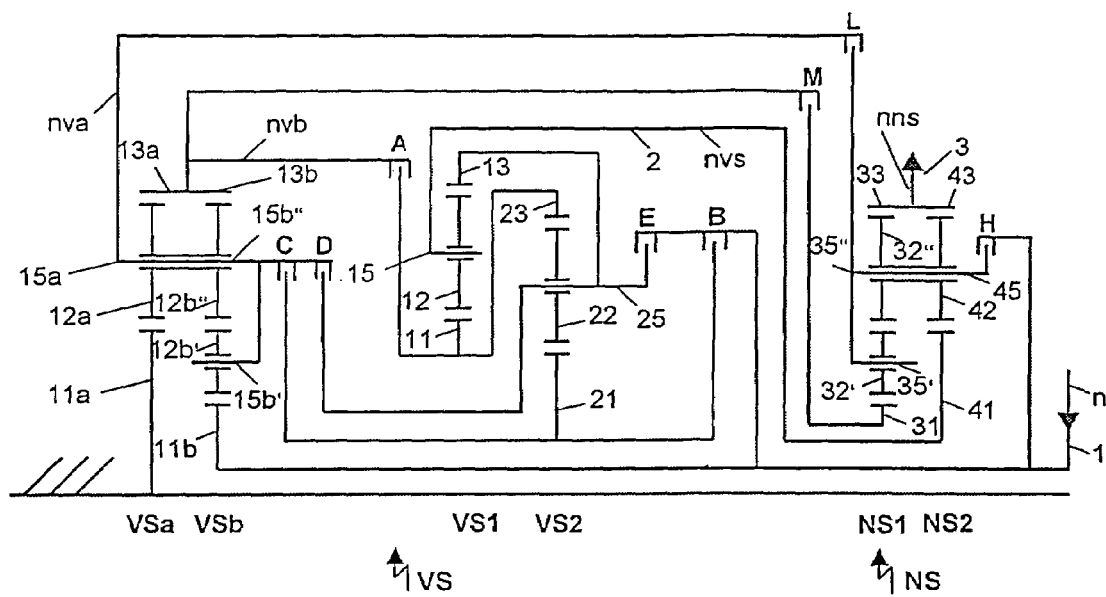

In an exemplary sixteenth design of a multi-step reduction gear pursuant to the invention, it is suggested to provide in the front-mounted group VS two coupled shiftable front-mounted planetary gear sets VS1 and VS2, as well as two additional coupled, non-shiftable front-mounted planetary gear sets VSA and VSb. FIG. 16A shows the appropriate shift pattern. As with the fifteenth design of the inventive multi-step reduction gear, five switch elements A, B, C, D, E designed as clutches are provided in the front-mounted group VS and three switch elements M, H and L designed as clutches in the rear-mounted group NS.

As depicted in FIG. 16A, the drive shaft 1 (speed n) is connected to the sun wheel 11$b$ of the fourth front-mounted planetary gear set VSb, as well as to the sun wheel 21 of the second shiftable front-mounted planetary gear set VS2 via the clutch B, to the planet carrier 25 of the planetary gears 22 of the second shiftable front-mounted planetary gear set VS2 via the clutch E and to the planet carrier 45 of the planetary gears 42 of the second rear-mounted planetary gear set NS2 via the clutch H. The sun wheel 11$a$ of the third front-mounted planetary gear set VSA is fixed.

The fourth front-mounted planetary gear set VSb is designed as a double-planetary gear group. The planet carrier 15$a$ (speed nva) with the planet gears 12$a$ of the third front-mounted planetary gear set VSA is connected to the planet carrier 15$b''$ of the exterior planet gears 12$b''$ of the fourth front-mounted planetary gear set VSb and the planet carrier 15$b'$ of the interior planet gears 12$b'$ of the fourth front-mounted planetary gear set (VSb). Moreover, the planet carrier 15$a$ of the third front-mounted planetary gear set VSA can be connected to the sun wheel 21 of the second shiftable front-mounted planetary gear set VS2 by means of the clutch C, to the planet carrier 25 of the planetary gears 22 of the second shiftable front-mounted planetary gear set VS2 by means of the clutch D and to the planet carrier 35$''$ of the exterior planet gears 32$''$ of the first rear-mounted planetary gear set NS1 by means of the clutch L. The planet gears 12$a$ of the third front-mounted planetary gear set VSA and the planet gears 12$b''$ of the fourth front-mounted planetary gear set VSb are hereby grouped. The ring gear 13$a$ (speed nvb) of the third front-mounted planetary gear set VSA and the ring gear 13$b$ of the fourth front-mounted planetary gear set VSb are coupled with each other. Both ring gears 13$a$ and 13$b$ can be connected to the sun wheel 11 of the first shiftable front-mounted planetary gear set VS1 by means of the clutch A and to the sun wheel 31 of the first rear-mounted planetary gear set NS1 by means of the clutch M. The sun wheel 11 of the first shiftable front-mounted planetary gear set VS1 is connected to the ring gear 23 of the second shiftable front-mounted planetary gear set VS2. The planet carrier 25 with the planet gears 22 of the second shiftable front-mounted planetary gear set VS2 is connected to the ring gear 13 of the first shiftable front-mounted planetary gear set VS1. The planet carrier 15 with the planet gears 12 of the first shiftable front-mounted planetary gear set VS1 is connected to the sun wheel 41 of the second rear-mounted planetary gear set NS2 via the spacer shaft 2 (speed nvs). The planet carrier 35$''$ with the exterior planet gears 32$''$ of the first rear-mounted planetary gear set NS1 and the planet carrier 35$'$ with the interior planet gears 32$'$ of the first rear-mounted planetary gear set NS1 and the planet carrier 45 of the planet gears 42 of the second rear-mounted planetary gear set NS2 are connected with each other. The exterior planet gears 32$''$ of the first rear-mounted planetary gear set NS1 and the planet gears 42 of the second rear-mounted planetary gear set NS2 are hereby grouped. The ring gears 33 and 43 of the first and second rear-mounted planetary gear groups NS1, NS2 are connected with each other and additionally with the output shaft 3 (speed nns).

By selectively shifting the eight switch elements A through E and H, M and L, pursuant to the shift logic shown in FIG. 16B, a total of twenty-six forward gears can be shifted. A reverse gear is not provided. Over the prior state-of-the-art, with this sixteenth design of an inventive multi-step reduction gear realizes twenty-six instead of seventeen forward gears with the same number of switch elements and wheel sets.

Due to the extremely compact design of the transmission and the elimination of the reverse gear, designs thirteen through sixteen of a multi-step reduction gear pursuant to the invention are particularly suited as hub shifting systems for bicycles.

Through the appropriate selection of gear ratios of the individual planetary gear sets, the fifteenth and sixteenth designs of the inventive multi-step reduction gear can also be used to derive a multi-step reduction gear with one, two or several reverse gears, respectively. Hereby the number of forward gears is reduced by the number of reverse gears, respectively. Such further developments of the inventive multi-step reduction gear are particularly suitable for multi-gear special-purpose drives.

In a further development of the invention it is suggested to install a second rear-mounted group NS' behind the rear-mounted group NS. This way—proceeding on the aforementioned multi-step reduction gears pursuant to the invention—very compact multi-gear transmissions can be derived with just a few additional components. Pursuant to the invention, it is suggested to design this second rear-mounted group NS' in a shiftable manner, with two further coupled rear-mounted planetary gear sets NS1', NS2' and two further switch elements M', H'. The second rear-mounted group NS' can hereby be connected on the input side on one hand to the drive shaft 1 (speed n) of the transmission via one of its switch elements and on the other hand is firmly connected to the output shaft 3 (speed nns) of the rear-mounted group NS for generating an output speed (nns').

Based on FIGS. 17A, 17B and 17C, 17D, two designs pursuant to the invention of a second rear-mounted group NS' will now be explained as two-planet carrier/four-shaft transmissions, with a first switch element M' designed as a brake and a second switch element H' designed as a clutch.

Figures 17A, 17B:
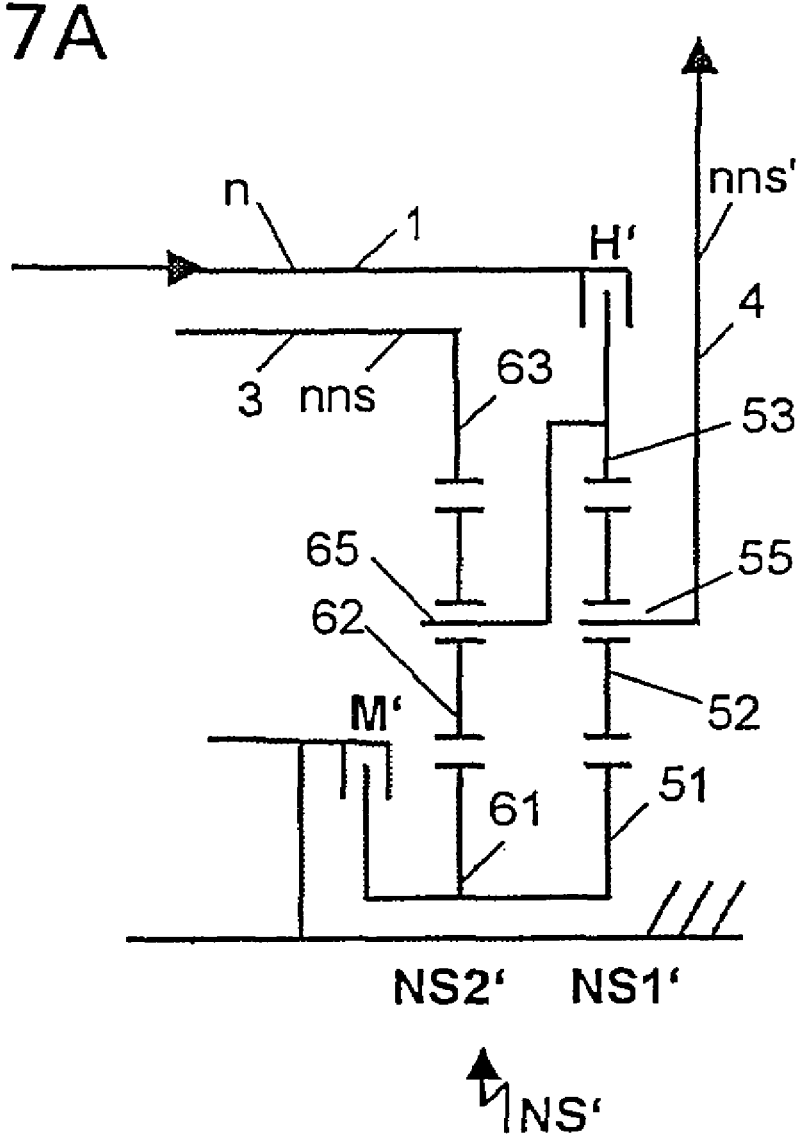
FIGS. 17A and 17B a first design of a second rear-mounted group pursuant to the invention.

FIG. 17A depicts a first design of an inventive second rear-mounted group NS' with two coupled rear-mounted planetary gear sets NS1', NS2', which can be shifted by means of the switch elements M', H'. The first rear-mounted planetary gear set NS1' of the second rear-mounted group NS1 hereby comprises a sun wheel 51, a ring gear 53 and a planet carrier 55 with planet gears 52, the second rear-mounted planetary gear set NS2' of the second rear-mounted group NS' comprises a sun wheel 61, a ring gear 63 and a planet carrier 65 with planet gears 62. The sun wheels 51 and 61 are connected to each other and can be fixed by means of the brake M'. The ring gear 53 and the planet carrier 65 are connected to each other and can be connected to the drive shaft 1 (speed n) of the transmission by means of the clutch H'. The ring gear 63 is connected to the output of the rear-mounted group NS via the output shaft 3 (speed nns). The planet carrier 55 forms the output of the second rear-mounted group NS' and is connected to an output shaft 4 (speed nns') of the transmission.

FIG. 17B shows exemplary standing gear ratios of this first design of a second rear-mounted group NS' pursuant to the invention.

Figures 17C, 17D:
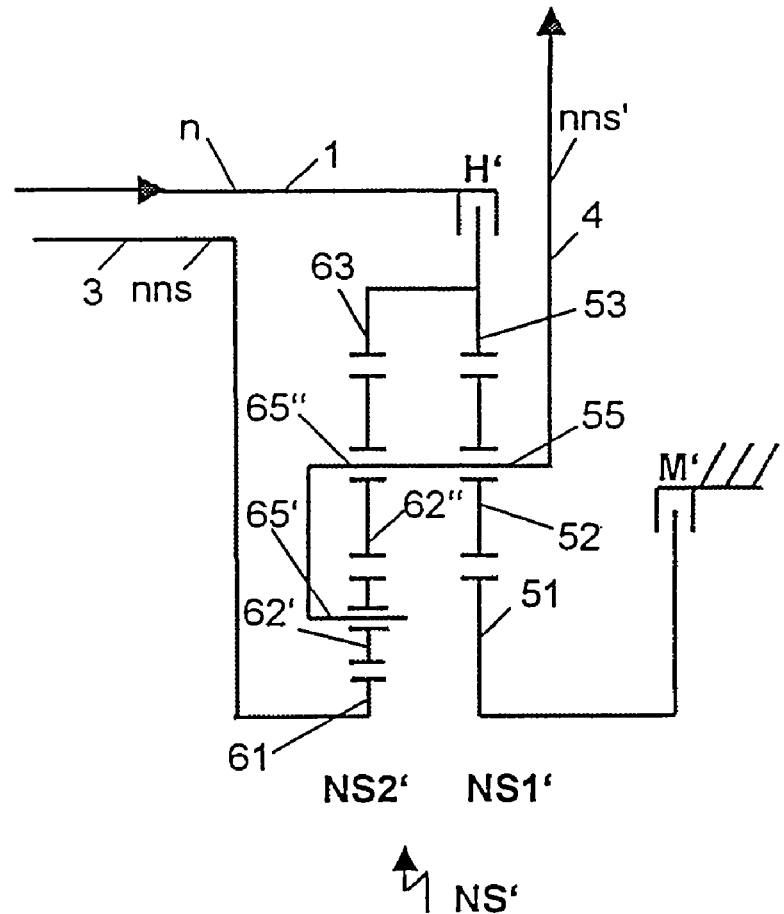
FIGS. 17C and 17D a second design of a second rear-mounted group pursuant to the invention.

FIG. 17C depicts a second design of an inventive second rear-mounted group NS' with two coupled rear-mounted planetary gear sets NS1', NS2', which can be shifted by means of the switch elements M', H'. The first rear-mounted planetary gear set NS1' of the second rear-mounted group NS' hereby comprises a sun wheel 51, a ring gear 53 and a planet carrier 55 with planet gears 52. The second rear-mounted planetary gear set NS2' of the second rear-mounted group NS' is designed as a plus-transmission and comprises a sun wheel 61, a ring gear 63 and two coupled planet carriers 65' and 65" with interior and exterior planet gears 62' and 62". The sun wheel 51 can be fixed by means of the brake M'. The ring gears 53 and 63 are connected to each other and can be connected to the drive shaft 1 (speed n) of the transmission by means of the clutch H'. The sun wheel 61 is connected to the output of the rear-mounted group NS via the output shaft 3 (speed nns). The planet carriers 55, 65', 65" are connected to one another, form the output of the second rear-mounted group NS' and are connected to the output shaft 4 (speed nns') of the transmission.

FIG. 17D shows exemplary standing gear ratios of this second design of a second rear-mounted group NS' pursuant to the invention.

Based on FIGS. 17E and 17F, an exemplary seventeenth design of a multi-step reduction gear pursuant to the invention with a second rear-mounted group NS' will now be explained. Overall, this gear comprises seven shiftable wheel sets and nine switch elements. In the front-mounted group VS, an additional third, non-shiftable front-mounted planetary gear set VSA can be arranged in front of the first two front-mounted planetary gear sets VS1 and VS2, which can be shifted by means of the clutches A, B, D, E and the brake C, similar to the designs fourteen and fifteen described above. The rear-mounted group NS, in turn, again comprises a first and a second rear-mounted planetary gear set NS1, NS2 and can be shifted by means of a brake M and a clutch H. Pursuant to the invention, a second, additionally rear-mounted group NS' is arranged behind the rear-mounted group NS, wherein NS' is connected firmly to the output shaft 3 of the rear-mounted group NS rotating at the output speed nns. The second rear-mounted group NS' is hereby designed as a shiftable two-planet carrier/four-shaft transmission and corresponds to the design shown in FIG. 17A, with third and fourth rear-mounted planetary gear sets NS3 and NS4, as well as a first switch element M' designed as a brake and a second switch element H' designed as a clutch.

Figure 17E:
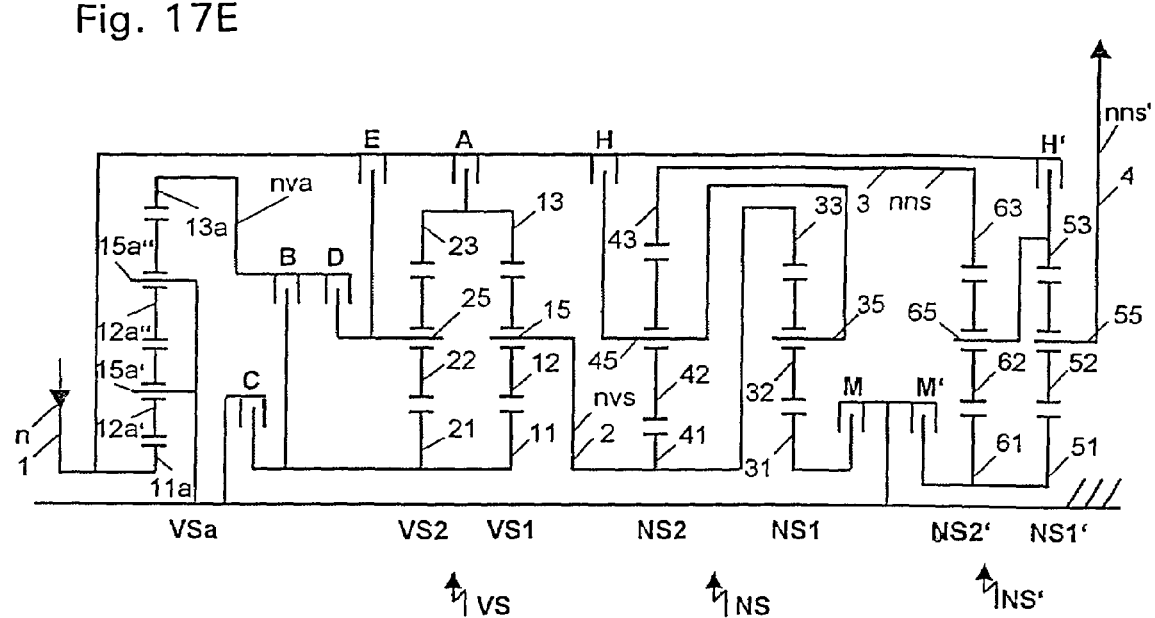

As depicted in FIG. 17E, the drive shaft 1 is connected to the sun wheel 11a of the third front-mounted planetary gear set VSA. Moreover, the drive shaft 1 can be connected to the planet carrier 25 of the planetary gears 22 of the second shiftable front-mounted planetary gear set VS2 via the clutch E, to the ring gear 13 of the first shiftable front-mounted planetary gear set VS1 by means of the clutch A, to the planet carrier 45 of the planetary gears 42 of the second rear-mounted planetary gear set NS2 via the clutch H, as well as to a planet carrier 65 with planet gears 62 of the fourth rear-mounted planetary gear set NS4 by means of the clutch H'. The third front-mounted planetary gear set VSA is designed as a plus-transmission in a double-planet design pursuant to the invention. The planet carrier 15a' with the interior planet gears 12a' and the planet carrier 15a" with the exterior planet gears 12a" of the third front-mounted planetary gear set VSA are connected to each other and are fixed. The ring gear 13a of the third front-mounted planetary gear set VSA can be connected to the sun wheel 21 of the second shiftable front-mounted planetary gear set VS2 by means of the clutch B and to the planet carrier 25 of the planetary gears 22 of the second shiftable front-mounted planetary gear set VS2 by means of the clutch D. The sun wheel 21 of the second shiftable front-mounted planetary gear set VS2 is connected to the sun wheel 11 of the first shiftable front-mounted planetary gear set VS1 and can be fixed by means of the brake C. The ring gear 13 of the first shiftable front-mounted planetary gear set VS1 is connected to the ring gear 23 of the second shiftable front-mounted planetary gear set VS2. The planet carrier 15 of the planet gears 12 of the first shiftable front-mounted planetary gear set VS1 is connected to the sun wheel 41 of the second rear-mounted planetary gear set NS2 and to the ring gear 33 of the first rear-mounted planetary gear set NS1 by means of the spacer shaft 2 rotating at a speed nvs. The planet carrier 45 of the planet gears 42 of the second rear-mounted planetary gear set NS2 and the planet carrier 35 of the planet gears 32 of the first rear-mounted planetary gear set NS1 are connected to each other. The sun wheel 31 of the first rear-mounted planetary gear set NS1 can be fixed by means of the brake M. The ring gear 43 of the second rear-mounted planetary gear set NS2 is connected to a ring gear 63 of the fourth rear-mounted planetary gear set NS4 by means of the output shaft 3 rotating at a speed nns. A sun wheel 51 of the third rear-mounted planetary gear set NS3 and a sun wheel 61 of the fourth rear-mounted planetary gear set NS4 are coupled and be fixed by means of the brake M' of the second rear-mounted group NS'. A ring gear 53 of the third rear-mounted planetary gear set NS3 and a planet carrier 65 with planet gears 62 of the fourth rear-mounted planetary gear set NS4 are connected to each other. A planet carrier 55 with planet gears 52 of the third rear-mounted planetary gear set NS3 is connected to an output shaft 4 of the transmission, which rotates at a speed nns'.

The aforementioned speed conditions 1 through 7 apply to the speeds on the shaft and switch elements, as do the following:

11. The speeds on the drive shaft 1 and on the shifted switch element H' are equal to the input speed n of the drive shaft 1;
12. the speed on the shifted switch element M' is equal to zero;
13. the speed on the spider gear, which is connected to the output shaft 3, of the second rear-mounted planetary gear set NS2' of the second rear-mounted group NS', which is generated by shifted switch elements H' and M' of the second rear-mounted group NS', is equal to/greater than the speed nns, which is generated by shifted switch elements in the front-mounted group VS and/or in the rear-mounted group NS.

FIG. 17F shows the shift logic of this seventeenth design of an inventive multi-step reduction gear. By selectively shifting the nine switch elements A, B, C, D, E and H, M as well as H', M' a total of thirty-five forward gears can be shifted with seven wheel sets, with beneficially close steps and without multiple connection that would impact shifting comfort. A reverse gear is not provided. Similar to the designs of the invention pursuant to FIGS. 13 through 16, this seventeenth design of an inventive multi-step reduction gear is suitable particularly as a compact multi-gear hub shifting system for bicycles.

Of course, the second shiftable rear-mounted group NS' can also be combined with other combinations of front-mounted and rear-mounted planetary gear sets in other further developments of the inventive multi-step reduction gear, for example, in connection with a non-shiftable front-mounted group and a shiftable rear-mounted group.

REFERENCE NUMERALS

Vs front-mounted group
VS1 first front-mounted planetary gear set
VS2 second front-mounted planetary gear set
VSA third front-mounted planetary gear set
VSb fourth front-mounted planetary gear set
NS rear-mounted group
NS1 first rear-mounted planetary gear set
NS2 second rear-mounted planetary gear set
NS' second rear-mounted group
NS1' first rear-mounted planetary gear set of the second rear-mounted group NS'
NS2' second rear-mounted planetary gear set of the second rear-mounted group NS'
A, B, C, switch elements of the front-mounted group VS
D, E
M, H, L, first through third switch element of the rear-mounted group NS
M', H' first and second switch element of the second rear-mounted
group NS'
n input speed of the drive shaft
nva output speed of the VSa wheel set
nvb output speed of the VSb wheel set
nvs output speed of the front-mounted group VS
nns output speed of the rear-mounted group NS
nns' output speed of the second rear-mounted group NS'
1 drive shaft
2 spacer shaft
3 output shaft (driven shaft)
4 output shaft
11 sun wheel of the VS1 wheel set
12 planet gear of the VS1 wheel set
12' interior planetary gear of the VS1 wheel set
12" exterior planetary gear of the VS1 wheel set
13 ring gear of the VS1 wheel set
15 planet carrier of the VS1 wheel set
15' planet carrier of the interior planetary gears of the VS1 wheel set
15" planet carrier of the exterior planetary gears of the VS1 wheel set
21 sun wheel of the VS2 wheel set
22 planet gear of the VS2 wheel set
22' interior planetary gear of the VS2 wheel set
22" exterior planetary gear of the VS2 wheel set
23 ring gear of the VS2 wheel set
25 planet carrier of the VS2 wheel set
25' planet carrier of the interior planetary gears of the VS2 wheel set
25" planet carrier of the exterior planetary gears of the VS2 wheel set
11a sun wheel of the VSa wheel set
12a planet gear of the VSa wheel set
12ak small planet gear of the VSa wheel set
12ag large planet gear of the VSa wheel set
12a' interior planetary gear of the VSa wheel set
12a" exterior planetary gear of the VSa wheel set
13a ring gear of the VSa wheel set
15a planet carrier of the VSa wheel set
15a' planet carrier of the interior planetary gears of the VSa wheel set
15a" planet carrier of the exterior planetary gears of the VSa wheel set
11b sun wheel of the VSb wheel set
12b' interior planetary gear of the VSb wheel set
12b" exterior planetary gear of the VSb wheel set 13b ring gear of the VSb wheel set
15b' planet carrier of the interior planetary gears of the VSb wheel set
15b" planet carrier of the exterior planetary gears of the VSb wheel set
31 sun wheel of the NS1 wheel set
32 planet gear of the NS1 wheel set
32' interior planetary gear of the NS1 wheel set
32" exterior planetary gear of the NS1 wheel set
33 ring gear of the NS1 wheel set
35 planet carrier of the NS1 wheel set
35' planet carrier of the interior planetary gears of the NS1 wheel set
35" planet carrier of the exterior planetary gears of the NS1 wheel set
41 sun wheel of the NS2 wheel set
42 planet gear of the NS2 wheel set
42' interior planetary gear of the NS2 wheel set
42" exterior planetary gear of the NS2 wheel set
43 ring gear of the NS2 wheel set
45 planet carrier of the NS2 wheel set
45' planet carrier of the interior planetary gears of the NS2 wheel set
45" planet carrier of the exterior planetary gears of the NS2 wheel set
51 sun wheel of the NS1' wheel set
52 planet gear of the NS1' wheel set
53 ring gear of the NS1' wheel set
55 planet carrier of the NS1' wheel set
61 sun wheel of the NS2' wheel set
62 planet gear of the NS2' wheel set
62' interior planetary gear of the NS2' wheel set
62" exterior planetary gear of the NS2' wheel set
63 ring gear of the NS2' wheel set
65 planet carrier of the NS2' wheel set
65' planet carrier of the interior planetary gears of the NS2' wheel set
65" planet carrier of the exterior planetary gears of the NS2' wheel set

What is claimed is:

1. A multi-step reduction gear comprising:
a drive shaft (1) which is connected to a front-mounted gear group (VS),
an output shaft (3) which is connected to a rear-mounted gear group (NS),
a plurality of switch elements (A, B, C, D, E) acting on the front-mounted gear group (VS); and
first and second switch elements (M, H, L) acting on the rear-mounted gear group (NS), and by selectively switching said switch elements (A, B, C, D, E and M, H, L), acting on the front-mounted and rear-mounted gear groups (VS, NS), an input speed (n) of the drive shaft (1) can be transmitted to the output shaft (3) for the purpose of shifting at least seven forward gears in such a way that in order to change from one gear to the next highest or next lowest gear the switch elements (A, B, C, D, E and M, H, L, M), acting on the front-mounted and rear-mounted gear groups (VS, NS), that have just been actuated only disconnect one switch element and connect one further switch element, and the rear-mounted group (NS) can be connected to the drive shaft (1) via at least the second switch element (H) acting on the rear-mounted group (NS);
wherein the front-mounted gear group (VS) is formed by first and second coupled, shiftable front-mounted planetary gear sets (VS1, VS2) and a maximum of two further non-shiftable front-mounted planetary gear sets (VSa, VSb), and the rear-mounted gear group (NS) is firmly connected to the front-mounted gear group (VS) by one spacer shaft (2) rotating at an output speed (nvs) of the front-mounted gear group (VS), with the spacer shaft not being connected to any one of the switch elements (A, B, C, D, E and M, H, L), acting on the front-mounted and rear-mounted gear groups (VS, NS), and the output speed (nvs) of the front-mounted gear group (VS) is generated by selectively engaging a maximum of two of the plurality switch elements (A, B, C, D, E) acting on the front-mounted gear group (VS).

2. The multi-step reduction gear pursuant to claim 1, wherein the rear-mounted group (NS) is a shiftable two-planet carrier/four-shaft transmission, including a first and a second rear-mounted planetary gear set (NS1, NS), the first switch element (M) of the rear-mounted group (NS) is a brake and the second switch element (H) of the rear-mounted group (NS) is a clutch, and the rear-mounted group (NS) can be connected to the drive shaft (1) through the second switch element (H), and at least nine forward gears can be shifted.

3. The multi-step reduction gear pursuant to claim 1, wherein the rear-mounted group (NS) is a shiftable two-planet carrier/four-shaft transmission, including a first and a second rear-mounted planetary gear set (NS1, NS2), the first switch element (M) is a clutch, the second switch element (H) is a clutch, and a third switch element (L), acting on the rear-mounted gear group (NS), is a clutch or a brake, and the rear-mounted group (NS) can be connected to the drive shaft (1) through the second switch element (H), and at least nine forward gears can be shifted.

4. The multi-step reduction gear pursuant to claim 1, wherein the spacer shaft (2), between the front-mounted group (VS) and the rear-mounted group (NS), is connected to a spider gear of a second rear-mounted planetary gear set (NS2).

5. The multi-step reduction gear pursuant to claim 4, wherein the spider gear of the second rear-mounted planetary gear set (NS2), with said gear being connected to the spacer shaft (2), is a sun wheel (41) of the second rear-mounted planetary gear set (NS2).

6. The multi-step reduction gear pursuant to claim 4, wherein the spider gear of the second rear-mounted planetary gear set (NS2), with said gear being connected to the spacer shaft (2), is a ring gear (43) of the second rear-mounted planetary gear set (NS2).

7. The multi-step reduction gear pursuant to claim 2, wherein:
the plurality of switch elements acting on the front-mounted group (VS) comprises first, second, third and fourth switch elements (A, B, C, D), a shiftable first front-mounted planetary gear set (VS1) with a sun wheel (11), a ring gear (13) and a planet carrier (15) with planetary gears (12), as well as a shiftable second front-mounted planetary gear set (VS2) with a sun wheel (21), a ring gear (23) and a planet carrier (25) with planetary gears (22);
the shiftable first rear-mounted planetary gear set (NS1) includes a sun wheel (31), a ring gear (33) and a planet carrier (35) with planetary gears (32);
the shiftable second rear-mounted planetary gear set (NS2) includes a sun wheel (41), a ring gear (43) and a planet carrier (45) with planetary gears (42);
the ring gear (13) of the first front-mounted planetary gear set (VS1) and the planet carrier (25) of the second front-mounted planetary gear set (VS2) are connected to each other and can be fixed by the fourth switch element (D) of the front-mounted group (VS);

the ring gear (23) of the second front-mounted planetary gear set (VS2) and the planet carrier (15) of the first front-mounted planetary gear set (VS1) are connected to each other and via the spacer shaft (2) also to the sun wheel (41) of the second rear-mounted planetary gear set (NS2);

the ring gear (33) of the first mar-mounted planetary gear set (NS1) and the planet carrier (45) of the second rear-mounted planetary gear set (NS2) are connected to each other and can be connected to the drive shaft (1) by the second switch element (H) of the rear-mounted group (NS);

the ring gear (43) of the second rear-mounted planetary gear set (NS2) and the planet carrier (35) of the first rear-mounted planetary gear set (NS1) are connected to each other and to the output shaft (3);

the sun wheel (11) of the first front-mounted planetary gear set (VS1) can be connected to the drive shaft (1) through the first switch element (A) of the front-mounted group (VS);

the sun wheel (21) of the second front-mounted planetary gear set (VS2) can be connected to the drive shaft (1) through the second switch element (B) of the front-mounted group (VS) and can be fixed by the third switch element (C) of the front-mounted group (VS); and the sun wheel (31) of the first rear-mounted planetary gear set (NS1) can be fixed by the first switch element (M) of the rear-mounted group (NS).

8. The multi-step reduction gear pursuant to claim 2, wherein:

the plurality of switch elements acting on the front-mounted group (VS) comprises first, second, third and fourth switch elements (A, B, D, E), a shiftable first front-mounted planetary gear set (VS1) with a sun wheel (11), a ring gear (13) and a planet carrier (15) with planetary gears (12), and a shiftable second front-mounted planetary gear set (VS2) with a sun wheel (21), a ring gear (23) and a planet carrier (25) with planetary gears (22);

the shiftable first rear-mounted planetary gear set (NS1) includes a sun wheel (31) a ring gear (33) and a planet carrier (35) with planetary gears (32);

the shiftable second rear-mounted planetary gear set (NS2) includes a sun wheel (41), a ring gear (43) and a planet carrier (45) with planetary gears (42);

the ring gear (13) of the first front-mounted planetary gear set (VS1) and the planet carrier (25) of the second front-mounted planetary gear set (VS2) are connected to each other, can be fixed by the third switch element (B) of the front-mounted group (VS) and can be connected to the drive shaft (1) through the fourth switch element (E) of the front-mounted group (VS);

the ring gear (23) of the second front-mounted planetary gear set (VS2) and the planet carrier (15) of the first front-mounted planetary gear set (VS1) are connected to each other and via the spacer shaft (2) also to the ring gear (43) of the second rear-mounted planetary gear set (NS2);

the ring gear (33) of the first rear-mounted planetary gear set (NS1) and the planet carrier (45) of the second rear-mounted planetary gear set (NS2) are connected to each other and can be connected to the drive shaft (1) by the second switch element (H) of the rear-mounted group (NS);

the sun wheels (31, 41) of the first and second rear-mounted planetary gear sets (NS1, NS2) are connected to each other and can be fixed by the first switch element (M) of the rear-mounted group (NS);

the sun wheel (21) of the second front-mounted planetary gear set (VS2) can be connected to the drive shaft (1) through the second switch element (B) of the front-mounted group (VS);

the sun wheel (11) of the first front-mounted planetary gear set (VS1) can be fixed by the first switch element (A) of the front-mounted group (VS); and the planet carrier (35) of the first rear-mounted planetary gear set (NS1) is connected to the output shaft (3).

9. The multi-step reduction gear pursuant to claim 2, wherein:

the plurality of switch elements (A, B, C, D, E) acting on the front-mounted group (VS) comprises first, second, third and fourth switch elements (A, B, C, D), a shiftable first front-mounted planetary gear set (VS1) with a sun wheel (11), a ring gear (13) and two coupled planet carriers (15', 15") with interior and exterior planetary gears (12', 12"), as well as a shiftable second front-mounted planetary gear set (VS2) with a sun wheel (21), a ring gear (23) and a planet carrier (25) with planetary gears (22);

the shiftable first rear-mounted planetary gear set (NS1) includes a sun wheel (31), a ring gear (33) and a planet carrier (35) with planetary gears (32);

the shiftable second rear-mounted planetary gear set (NS2) includes a sun wheel (41), a ring gear (43) and two coupled planet carriers (45', 45") with interior and exterior planetary gears (42', 42');

the ring gears (13, 23) of the two front-mounted planetary gear sets (VS1, VS2) are connected to each other and are connected to the sun wheel (41) of the second rear-mounted planetary gear set (NS2) by the spacer shaft (2);

the planet carriers (15', 15", 25) of the two front-mounted planetary gear sets (VS1, VS2) are connected to each other and can be fixed with the fourth switch element (D) of the front-mounted group (VS);

the ring gears (33, 43) of the two rear-mounted planetary gear sets (NS1, NS2) are connected to each other and can be connected to the drive shaft (1) by the second switch element (H) of the rear-mounted group (NS);

the planet carriers (35, 45", 45') of the two rear-mounted planetary gear sets (NS1, NS2) are connected to each other and to the output shaft (3);

the sun wheel (11) of the first front-mounted planetary gear set (VS1) can be connected to the drive shaft (1) through the first switch element (A) of the front-mounted group (VS);

the sun wheel (21) of the second front-mounted planetary gear set (VS2) can be connected to the drive shaft (1) through the second switch element (B) of the front-mounted group (VS) and can be fixed by the third switch element (C) of the front-mounted group (VS); and the sun wheel (31) of the first rear-mounted planetary gear set (NS1) can be fixed by the first switch element (M) of the rear-mounted group (NS).

10. The multi-step reduction gear pursuant to claim 2, wherein:

the plurality of switch elements (A, B, D, E) acting on the front-mounted group (VS) comprises first, second, third, fourth and fifth switch elements (A, B, C, D, E), a shiftable first front-mounted planetary gear set (VS1) with a sun wheel (11), a ring gear (13) and a planet carrier (15) with planetary gears (12), as well as a shiftable second front-mounted planetary gear set (VS2) with a sun wheel (21), a ring gear (23) and a planet carrier (25) with planetary gears (22);

the shiftable first rear-mounted planetary gear set (NS1) includes a sun wheel (31), a ring gear (33) and a planet carrier (35) with planetary gears (32);

the shiftable second rear-mounted planetary gear set (NS2) includes a sun wheel (41), a ring gear (43) and a planet carrier (45) with planetary gears (42);

the ring gear (13) of the first front-mounted planetary gear set (VS1) and the planet carrier (25) of the second front-mounted planetary gear set (VS2) are connected to each other, can be fixed by the fourth switch element (D) of the front-mounted group (VS) and can be connected to the drive shaft (1) by the fifth switch element (E) of the front-mounted group (VS);

the ring gear (23) of the second front-mounted planetary gear set (VS2) and the planet carrier (15) of the first front-mounted planetary gear set (VS1) are connected to each other and via the spacer shaft (2) also to the sun wheel (41) of the second rear-mounted planetary gear set (NS2);

the ring gear (33) of the first rear-mounted planetary gear set (NS1) and the planet carrier (45) of the second rear-mounted planetary gear set (NS2) are connected to each other and can be connected to the drive shaft (1) by the second switch element (H) of the rear-mounted group (NS);

the ring gear (43) of the second rear-mounted planetary gear set (NS2) and the planet carrier (35) of the first rear-mounted planetary gear set (NS1) are connected to each other and to the output shaft (3);

the sun wheel (11) of the first front-mounted planetary gear set (VS1) can be fixed through the first switch element (A) of the front-mounted group (VS);

the sun wheel (21) of the second front-mounted planetary gear set (VS2) can be connected to the drive shaft (1) through the second switch element (B) of the front-mounted group (VS) and can be fixed by the third switch element (C) of the front-mounted group (VS); and the sun wheel (31) of the first rear-mounted planetary gear set (NS1) can be fixed by the first switch element (M) of the rear-mounted group (NS).

11. The multi-step reduction gear pursuant to claim 2, wherein:

the plurality of switch elements (A, B, C, D, E) acting on the front-mounted group (VS) comprises first, second, third, fourth and fifth switch elements (A, B, C, D, E), a shiftable first front-mounted planetary gear set (VS1) with a sun wheel (11), a ring gear (13) and a planet carrier (15) with planetary gears (12), as well as a shiftable second front-mounted planetary gear set (VS2) with a sun wheel (21), a ring gear (23) and a planet carrier (25) with planetary gears (22);

the shiftable first rear-mounted planetary gear set (NS1) includes a sun wheel (31), a ring gear (33) and a planet carrier (35) with planetary gears (32);

the shiftable second rear-mounted planetary gear set (NS2) includes a sun wheel (41), a ring gear (43) and a planet carrier (45) with planetary gears (42);

the ring gear (13) of the first front-mounted planetary gear set (VS1) and the planet carrier (25) of the second front-mounted planetary gear set (VS2) are connected to each other, can be fixed by the fourth switch element (D) of the front-mounted group (VS) and can be connected to the drive shaft (1) by the fifth switch element (E) of the front-mounted group (VS);

the ring gear (23) of the second front-mounted planetary gear set (VS2) and the planet carrier (15) of the first front-mounted planetary gear set (VS1) are connected to each other and via the spacer shaft (2) also to the ring gear (43) of the second rear-mounted planetary gear set (NS2);

the ring gear (33) of the first rear-mounted planetary gear set (NS1) and the planet carrier (45) of the second rear-mounted planetary gear set (NS2) are connected to each other and can be connected to the drive shaft (1) by the second switch element (H) of the rear-mounted group (NS);

the planet carrier (35) of the first rear-mounted planetary gear set (NS1) is connected to the output shaft (3);

the sun wheel (11) of the first front-mounted planetary gear set (VS1) can be connected to the drive shaft (1) through the first switch element (A) of the front-mounted group (VS);

the sun wheel (21) of the second front-mounted planetary gear set (VS2) can be connected to the drive shaft (1) through the second switch element (B) of the front-mounted group (VS) and can be fixed by the third switch element (C) of the front-mounted group (VS); and the sun wheels (31, 41) of the two rear-mounted planetary gear sets (NS1, NS2) are connected to each other and can be fixed by the first switch element (M) of the rear-mounted group (NS).

12. The multi-step reduction gear pursuant to claim 2, wherein:

the plurality of switch elements (A, B, C, D, E) acting on the front-mounted group (VS) comprises first, second, third, fourth and fifth switch elements (A, B, C, D, E), a shiftable first front-mounted planetary gear set (VS1) with a sun wheel (11), a ring gear (13) and a planet carrier (15) with planetary gears (12), a shiftable second front-mounted planetary gear set (VS2) with a sun wheel (21), a ring gear (23) and a planet carrier (25) with planetary gears (22), as well as a non-shiftable third front-mounted planetary gear set (VSa) includes a sun wheel (11a), a ring gear (13a) and two coupled planet carriers (15a', 15a") with interior and exterior planetary gears (12a', 12a");

the shiftable first rear-mounted planetary gear set (NS1) includes comprises a sun wheel (31), a ring gear (33) and a planet carrier (35) with planetary gears (32);

the shiftable second rear-mounted planetary gear set (NS2) includes a sun wheel (41), a ring gear (43) and a planet carrier (45) with planetary gears (42);

the sun wheel (11a) of the third front-mounted planetary gear set (VSa) is fixed;

the coupled planet carriers (15a', 15a") of the third front-mounted planetary gear set (VSa) are connected to the drive shaft (1);

the sun wheel (11a) of the first front-mounted planetary gear set (VS1) can be connected to the drive shaft (1) through the first switch element (A) of the front-mounted group (VS);

the sun wheel (21) of the second front-mounted planetary gear set (VS2) can be connected to the ring gear (13a) of the third front-mounted planetary gear set (VSa) through the second switch element (B) of the front-mounted group (VS) and can be fixed through the third switch element (C) of the front-mounted group (VS);

the sun wheel (31) of the first rear-mounted planetary gear set (NS1) can be fixed through the first switch element (M) of the rear-mounted group (NS);

the ring gear (13) of the first front-mounted planetary gear set (VS1) and the planet carrier (25) of the second front-mounted planetary gear set (VS2) are connected to each other, can be fixed through the fourth switch element (D) of the front-mounted group (VS) and can be connected to the drive shaft (1) by the fifth switch element (E) of the front-mounted group (VS);

the ring gear (23) of the second front-mounted planetary gear set (VS2) and the planet carrier (15) of the first front-mounted group gear set (VS1) are connected to each other and via the spacer shaft (2) to the sun wheel (41) of the second rear-mounted planetary gear set (NS2);

the ring gear (33) of the first rear-mounted planetary gear set (NS1) and the planet carrier (45) of the second rear-mounted group gear set (NS2) are connected to each other and can be connected via the second switch element (H) of the rear-mounted group (NS) to the drive shaft (1); and the ring gear (43) of the second rear-mounted planetary gear set (NS2) and the planet carrier (35) of the first rear-mounted gear set (NS1) are connected to each other and to the output shaft (3).

13. The multi-step reduction gear pursuant to claim 2, wherein:

the plurality of switch elements (A, B, C, D, E) acting on the front-mounted group (VS) comprises first, second, third, fourth and fifth switch elements (A, B, C, D, E), a shiftable first front-mounted planetary gear set (VS1) with a sun wheel (11), a ring gear (13) and a planet carrier (15) with planetary gears (12), a shiftable second front-mounted planetary gear set (VS2) with a sun wheel (21), a ring gear (23) and a planet carrier (25) with planetary gears (22), as well as a non-shiftable third front-mounted planetary gear set (Vsa) with a sun wheel (11a), a ring gear (13a) and a planet carrier (15a) with a stepped planetary gear system comprising small and large planetary gears (12ak, 12ag);

the shiftable first rear-mounted planetary gear set (NS1) includes a sun wheel (31), a ring gear (33) and a planet carrier (35) with planetary gears (32);

the shiftable second rear-mounted planetary gear set (NS2) includes a sun wheel (41), a ring gear (43) and a planet carrier (45) with planetary gears (42);

the sun wheel (11a) of the third front-mounted planetary gear set (VSa) engages with the small planetary gears (12ak) of the third front-mounted planetary gear set (VSa) and is fixed;

the ring gear (13a) of the third front-mounted planetary gear set (VSa) is connected to the drive shaft (1) and engages on the large planetary gears (12ag) of the third front-mounted planetary gear set (VSa);

the sun wheels (11, 21) of the two front-mounted planetary gear sets (VS1, VS2) are connected to each other, can be fixed through the third switch element (C) of the front-mounted group (VS), and can be connected to the planet carrier (15a) of the third front-mounted planetary gear set (VSa) by the second switch element (B) of the front-mounted group (VS);

the ring gears (13, 23) of the two front-mounted planetary gear sets (VS1, VS2) are connected to each other and can be connected to the drive shaft (1) by the first switch element (A) of the front-mounted group (VS);

the planet carrier (25) of the second front-mounted planetary gear set (VS2) can be connected to the planet carrier (15a) of the third front-mounted planetary gear set (VSa) through the fourth switch element (D) of the front-mounted group (VS) as well as to the drive shaft (1) by the fifth switch element (E) of the front-mounted group (VS);

the planet carriers (35, 45) of the two rear-mounted planetary gear sets (NS1, NS2) are connected to each other and can be connected to the drive shaft (1) through the second switch element (H) of the rear-mounted group (NS);

the sun wheel (41) of the second rear-mounted planetary gear set (NS2) and the ring gear (33) of the first rear-mounted gear set (NS1) are connected to each other and via the spacer shaft (2) to the planet carrier (15) of the first front-mounted planetary gear set (VS1);

the sun wheel (31) of the first rear-mounted planetary gear set (NS1) can be fixed via the first switch element (M) of the rear-mounted group (NS); and the ring gear (43) of the second rear-mounted planetary gear set (NS2) is connected to the output shaft (3).

14. The multi-step reduction gear pursuant to claim 2, wherein:

the plurality of switch elements (A, B, C, D, E) acting on the front-mounted group (VS) comprises first, second, third, fourth and fifth switch elements (A, B, C, D, E), a shiftable first front-mounted planetary gear set (VS1) with a sun wheel (11), a ring gear (13) and a planet carrier (15) with planetary gears (12), a shiftable second front-mounted planetary gear set (VS2) with a sun wheel (21), a ring gear (23) and a planet carrier (25) with planetary gears (22), as well as a non-shiftable third front-mounted planetary gear set (Vsa) with a sun wheel (11a), a ring gear (13a) and two coupled planet carriers (15a', 15a") with interior and exterior planetary gears (12a', 12a);

the shiftable first rear-mounted planetary gear set (NS1) includes a sun wheel (31), a ring gear (33) and a planet carrier (35) with planetary gears (32);

the shiftable second rear-mounted planetary gear set (NS2) includes a sun wheel (41), a ring gear (43) and a planet carrier (45) with planetary gears (42);

the sun wheel (11a) of the third front-mounted planetary gear set (VSa) is fixed;

the coupled planet carriers (15a', 15a") of the third front-mounted planetary gear set (VSa) are connected to the drive shaft (1);

the sun wheel (11) of the first front-mounted planetary gear set (VS1) and the ring gear (23) of the second front-mounted planetary gear set (VS2) are connected to each other and can be connected by the first switch element (A) of the front-mounted group (VS);

the sun wheel (21) of the second front-mounted planetary gear set (VS2) can be connected to the ring gear (13a) of the third front-mounted planetary gear set (VSa) through the second switch element (B) of the front-mounted group (VS) and can be fixed by the third switch element (C) of the front-mounted group (VS);

the ring gear (13) of the first front-mounted planetary gear set (VS1) and the planet carrier (25) of the second front-mounted planetary gear set (VS2) are connected to each other, can be connected to the ring gear (13a) of the third front-mounted planetary gear set (VSa) through the fourth switch element (D) of the front-mounted group (VS) as well as to the drive shaft (1) by the fifth switch element (E) of the front-mounted group (VS);

the sun wheel (41) of the second rear-mounted planetary gear set (NS2) and the ring gear (33) of the first rear-mounted planetary gear set (NS1) are connected to each other and can be connected to the planet carrier (15) of the first front-mounted planetary gear set (VS1) through the spacer shaft (2);

the planet carriers (35, 45) of the two rear-mounted planetary gear sets (NS1, NS2) are connected to each other and can be connected to the drive shaft (1) via the second switch element (H) of the rear-mounted group (NS);

the sun wheel (31) of the first rear-mounted planetary gear set (NS1) can be fixed via the first switch element (M) of the rear-mounted group (NS); and the ring gear (43) of the second rear-mounted planetary gear set (NS2) is connected to the output shaft (3).

15. The multi-step reduction gear pursuant to claim 3, wherein:

the plurality of switch elements (A, B, C, D, E) acting on the front-mounted group (VS) comprises first, second and third switch elements (A, B, D), a shiftable first front-mounted planetary gear set (VS1) with a sun wheel (11), a ring gear (13) and a planet carrier (15) with planetary gears (12), as well as a shiftable second front-mounted planetary gear set (VS2) with a sun wheel (21), a ring gear (23) and a planet carrier (25) with planetary gears (22);

the shiftable first rear-mounted planetary gear set (NS1) includes a sun wheel (31), a ring gear (33) and a planet carrier (35) with planetary gears (32);

the shiftable second rear-mounted planetary gear set (NS2) includes a sun wheel (41), a ring gear (43) and a planet carrier (45) with planetary gears (42);

the sun wheel (11) of the first front-mounted planetary gear set (VS1) can be fixed by the first switch element (A) of the front-mounted group (VS);

the sun wheel (21) of the second front-mounted planetary gear set (VS2) can be connected to the drive shaft (1) through the second switch element (B) of the front-mounted group (VS);

the sun wheel (31) of the first rear-mounted planetary gear set (NS1) can be connected to the drive shaft (1) by the first switch element (M) of the rear-mounted group (NS);

the ring gear (13) of the first front-mounted planetary gear set (VS1) and the planet carrier (25) of the second front-mounted planetary gear set (VS2) are connected to each other and can be fixed by the third switch element (D) of the front-mounted group (VS);

the ring gear (23) of the second front-mounted planetary gear set (VS2) and the planet carrier (15) of the first front-mounted planetary gear set (VS1) are connected to each other and to the sun wheel (41) of the second rear-mounted group gear set (NS2) via the spacer shaft (2);

the ring gear (33) of the first rear-mounted planetary gear set (NS1) and the planet carrier (45) of the second rear-mounted planetary gear set (NS2) are connected to each other, can be connected to the drive shaft (1) by the second switch element (H) of the rear-mounted group (NS) and can be fixed by the third switch element (L) of the rear-mounted group (NS); and the ring gear (43) of the second rear-mounted planetary gear set (NS2) and the planet carrier (35) of the first rear-mounted planetary carrier set (NS1) are connected to each other and to the output shaft (3).

16. The multi-step reduction gear pursuant to claim 3, wherein:

the plurality of switch elements (A, B, C, D, E) acting on the front-mounted group (VS) comprises first, second, third and fourth switch elements (A, B, D, E), a shiftable first front-mounted planetary gear set (VS1) with a sun wheel (11), a ring gear (13) and a planet carrier (15) with planetary gears (12), as well as a shiftable second front-mounted planetary gear set (VS2) with a sun wheel (21), a ring gear (23) and a planet carrier (25) with planetary gears (22);

the shiftable first rear-mounted planetary gear set (NS1) includes a sun wheel (31), a ring gear (33) and a planet carrier (35) with planetary gears (32);

the shiftable second rear-mounted planetary gear set (NS2) includes a sun wheel (41), a ring gear (43) and a planet carrier (45) with planetary gears (42);

the sun wheel (11) of the first front-mounted planetary gear set (VS1) can be fixed by the first switch element (A) of the front-mounted group (VS);

the sun wheel (21) of the second front-mounted planetary gear set (VS2) can be connected to the drive shaft (1) by the second switch element (B) of the front-mounted group (VS);

the sun wheel (31) of the first rear-mounted planetary gear set (NS1) can be connected to the drive shaft (1) by the first switch element (M) of the rear-mounted group (NS);

the ring gear (13) of the first front-mounted planetary gear set (VS1) and the planet carrier (25) of the second front-mounted planetary gear set (VS2) are connected to each other, can be fixed by the third switch element (D) of the front-mounted group (VS), and can be connected to the drive shaft (1) by the fourth switch element (E) of the front-mounted group (VS);

the ring gear (23) of the second front-mounted planetary gear set (VS2) and the planet carrier (15) of the first front-mounted planetary gear set (VS1) are connected to each other and via the spacer shaft (2) to the sun wheel (41) of the second rear-mounted gear set (NS2);

the ring gear (33) of the first rear-mounted planetary gear set (NS1) and the planet carrier (45) of the second rear-mounted planetary gear set (NS2) are connected to each other, can be connected to the drive shaft (1) by the second switch element (H) of the rear-mounted group (NS) and can be fixed by the third switch element (L) of the rear-mounted group (NS); and the ring gear (43) of the second rear-mounted planetary gear set (NS2) and the planet carrier (35) of the first rear-mounted planetary carrier set (NS1) are connected to each other and to the output shaft (3).

17. The multi-step reduction gear pursuant to claim 3, wherein:

the plurality of switch elements (A, B, C, D, E) acting on the front-mounted group (VS) comprises first, second, third and fourth switch elements (A, B, C, D), a shiftable first front-mounted planetary gear set (VS1) with a sun wheel (11), a ring gear (13) and a planet carrier (15) with planetary gears (12), as well as a shiftable second front-mounted planetary gear set (VS2) with a sun wheel (21), a ring gear (23) and a planet carrier (25) with planetary gears (22);

the shiftable first rear-mounted planetary gear set (NS1) includes a sun wheel (31), a ring gear (33) and a planet carrier (35) with planetary gears (32);

the shiftable second rear-mounted planetary gear set (NS2) includes a sun wheel (41), a ring gear (43) and a planet carrier (45) with planetary gears (42);

the sun wheel (11) of the first front-mounted planetary gear set (VS1) can be connected to the drive shaft (1) by the first switch element (A) of the front-mounted group (VS);

the sun wheel (21) of the second front-mounted planetary gear set (VS2) can be connected to the drive shaft (1) through the second switch element (B) of the front-mounted group (VS) and can be fixed by the third switch element of the front-mounted group (VS);

the ring gear (13) of the first front-mounted planetary gear set (VS1) and the planet carrier (25) of the second front-mounted planetary gear set (VS2) are connected to each other and can be fixed by the fourth switch element (D) of the front-mounted group (VS);

the ring gear (23) of the second front-mounted planetary gear set (VS2) and the planet carrier (15) of the first front-mounted planetary gear set (VS1) are connected to each other and to the spacer shaft (2);

the spacer shaft (2) is connected to the sun wheel (41) of the second rear-mounted planetary gear set (NS2) and to the ring gear (33) of the first rear-mounted planetary gear set (NS1) coupled to said sun wheel (41);

the sun wheel (31) of the first rear-mounted planetary gear set (NS1) can be connected to the drive shaft (1) by the first switch element (M) of the rear-mounted group (NS);

the planet carriers (35, 45) of the two rear-mounted planetary gear sets (NS1, NS2) are connected to each other, can be connected to the drive shaft (1) via the second switch element (H) of the rear-mounted group (NS) and can be fixed by the third switch element (L) of the rear-mounted group (NS); and the ring gear (43) of the second rear-mounted planetary gear set (NS2) is connected to the output shaft (3).

18. The multi-step reduction gear pursuant to claim 3, wherein:

the plurality of switch elements (A, B, C, D, E) acting on the front-mounted group (VS) comprises first, second, third, fourth and fifth switch elements (A, B, C, D, E), a shiftable first front-mounted planetary gear set (VS1) with a sun wheel (11), a ring gear (13) and a planet carrier (15) with planetary gears (12), a shiftable second front-mounted planetary gear set (VS2) with a sun wheel (21), a ring gear (23) and a planet carrier (25) with planetary gears (22), as well as a non-shiftable third front-mounted planetary gear set (VSa) with a sun wheel (11a), a ring gear (13a) and two coupled planet carriers (15a', 15a") with interior and exterior planetary gears (12a', 12a");

the shiftable first rear-mounted planetary gear set (NS1) includes a sun wheel (31), a ring gear (33) and a planet carrier (35) with planetary gears (32);

the shiftable second rear-mounted planetary gear set (NS2) includes a sun wheel (41), a ring gear (43) and a planet carrier (45) with planetary gears (42);

the drive shaft (1) is connected to the sun wheel (11a) of the third front-mounted planetary gear set (VSa);

the drive shaft (1) can be connected to the sun wheel (11) of the first front-mounted planetary gear set (VS1) via the first switch element (A) of the front-mounted group (VS);

the drive shaft (1) can be connected to the planet carrier (25) of the second front-mounted planetary gear set (VS2) via the fifth switch element (2) of the front-mounted group (VS);

the drive shaft (1) can be connected to the planet carrier (45) of the second rear-mounted planetary gear set (NS2) via the second switch element (H) of the rear-mounted group (NS);

the coupled planet carriers (15a', 15a") of the third front-mounted planetary gear set (VSa) are fixed;

the sun wheel (21) of the second front-mounted planetary gear set (VS2) can be fixed by the third switch element (C) of the front-mounted group (VS) by the planet carrier (15a") of the exterior planetary gears (12a") of the third front-mounted planetary gear set (VSa);

the ring gear (13a) of the third front-mounted planetary gear set (VSa) can be connected to the sun wheel (21) of the second front-mounted planetary gear set (VS2) through the second switch element (B) of the front-mounted group (VS);

the ring gear (13a) of the third front-mounted planetary gear set (VSa) can be connected to the planet carrier (25) of the second front-mounted planetary gear set (VS2) through the fourth switch element (D) of the front-mounted group (VS);

the ring gear (13a) of the third front-mounted planetary gear set (VSa) can be connected to the planet carrier (45) of the second rear-mounted planetary gear set (NS2) through the third switch element (L) of the rear-mounted group (NS);

the ring gear (13a) of the third front-mounted planetary gear set (VSa) can be connected to the sun wheel (31) of the first rear-mounted planetary gear set (NS1) by the first switch element (M) of the rear-mounted group (NS);

the planet carrier (25) of the second front-mounted planetary gear set (VS2) and the ring gear (13) of the first front-mounted planetary gear set (VS1) are connected to each other;

the sun wheel (11) of the first front-mounted planetary gear set (VS1) and the ring gear (23) of the second front-mounted planetary gear set (VS2) are connected to each other;

the planet carrier (15) of the first front-mounted planetary gear set (VS1) is connected to the sun wheel (41) of the second rear-mounted planetary gear set (NS2) via the spacer shaft (2);

the planet carrier (45) of the second rear-mounted planetary gear set (NS2) is connected to the ring gear (33) of the first rear-mounted planetary gear set (NS1); and the planet carrier (35) of the first rear-mounted planetary gear set (NS1) is connected to the ring gear (43) of the second rear-mounted planetary gear set (NS2) and to the output shaft (3).

19. The multi-step reduction gear pursuant to claim 3, wherein:

the front-mounted group (VS) further includes a non-shiftable third front-mounted planetary gear set (VSa), a non-shiftable fourth front-mounted planetary gear set (Vsb) and the plurality of switch elements (A, B, C, D, E) acting on the front-mounted group (VS) comprises first, second, third, fourth and fifth switch elements (A, B, C, D, E);

the drive shaft (1) is connected to the sun wheel (11b) of the fourth front-mounted planetary gear set (VSb);

the drive shaft (1) can be connected to a sun wheel (21) of the second shiftable front-mounted planetary gear set (VS2) via the second switch element (B) of the front-mounted group (VS);

the drive shaft (1) can be connected to a planet carrier (25) comprising planetary gears (22) of the second shiftable front-mounted planetary gear set (VS2) via the fifth switch element (E) of the front-mounted group (VS);

the drive shaft (1) can be connected to a planet carrier (45) comprising planetary gears (42) of the second rear-mounted planetary gear set (NS2) via the second switch element (H) of the rear-mounted group (NS);

a sun wheel (11a) of the third front-mounted planetary gear set (VSa) is fixed;

a planet carrier (15a) with planetary gears (12a) of the third front-mounted planetary gear set (VSa) is connected to a planet carrier (15b") comprising exterior planetary gears (12b") of the fourth front-mounted planetary gear set (VSb);

the planet carrier (15a) of the third front-mounted planetary gear set (VSa) is connected to a planet carrier (15b') with interior planetary gears (12b') of the fourth front-mounted planetary gear set (VSb);

the planet carrier (15a) of the third front-mounted planetary gear set (VGSa) is connected to the sun wheel (21) of the second shiftable front-mounted planetary gear set (VS2) by the third switch element (C) of the front-mounted group (VS);

the planet carrier (15a) of the third front-mounted planetary gear set (VGSa) can be connected to the planet carrier (25) of the second shiftable front-mounted planetary gear set (VS2) by the fourth switch element (D) of the front-mounted group (VS):

the planet carrier (15a) of the third front-mounted planetary gear set (VGSa) can be connected to a planet carrier (35") with exterior planetary gears (32") of the first rear-mounted planetary gear set (NS1) by the third switch element (L) of the rear-mounted group (NS);

the planetary gears (12a) of the third front-mounted planetary gear set (VGSa) and the exterior planetary gears (12b") of the fourth front-mounted planetary gear set (VSb) are grouped;

a ring gear (13a) of the third front-mounted planetary gear set (VSa) and a ring gear (13b) of the fourth front-mounted planetary gear set (VSb) are connected to each other;

the ring gears (13a, 13b) of the third and fourth front-mounted planetary gear sets (VSa, VSb) can be connected to a sun wheel (11) of the first shiftable front-mounted planetary gear set (VS1) by the first switch element (A) of the front-mounted group (VS);

the ring gears (13a, 13b) of the third and fourth front-mounted planetary gear sets (VSa, VSb) can be connected to a sun wheel (31) of the first rear-mounted planetary gear set (NS1) by the first switch element (M) of the rear-mounted group (NS);

the sun wheel (11) of the first shiftable front-mounted planetary gear set (VS1) is connected to a ring gear (23) of the second shiftable front-mounted planetary gear set (VS2);

the planet carrier (25) of the second shiftable front-mounted planetary gear set (VS2) is connected to a ring gear (13) of the first shiftable front-mounted planetary gear set (VS1);

a planet carrier (15) with planetary gears (12) of the first shiftable front-mounted planetary gear set (VS1) is connected to a sun wheel (41) of the second rear-mounted planetary gear set (NS2) via the spacer shaft (2);

the planet carrier (35") with the exterior planetary gears (32") of the first rear-mounted planetary gear set (NS1) and a planet carrier (35') with interior planetary gears (32') of the first rear-mounted planetary gear set (NS1) and the planet carrier (45) with the planetary gears (42) of the second rear-mounted planetary gear set (NS2) are connected to each other;

the exterior planetary gears (32") of the first rear-mounted planetary gear set (NS1) and the planetary gears (42) of the second rear-mounted planetary gear set (NS2) are grouped;

a ring gear (33) of the first rear-mounted planetary gear set (NS1) and a ring gear (43) of the second rear-mounted planetary gear set (NS2) are connected to each other;

the ring gears (33,43) of the first and second rear-mounted planetary gear sets (NS1, NS2) are connected to the output shaft (3).

20. A multi-step reduction gear, comprising:

a drive shaft (1) connected to a front-mounted gear group (VS), an output shaft (3) connected to a rear-mounted gear group (NS), a plurality of switch elements (A, B, C, D, E) acting on the front-mounted gear group (VS); and first, second and third switch elements (M, H, L) acting on the rear-mounted gear group (NS), and by selectively switching said switch elements (A, B, C, D, E and M, H, L), acting on the front-mounted and rear-mounted gear groups (VS, NS), an input speed (n) of the drive shaft (1) can be transmitted to the output shaft (3) for the purpose of shifting at least seven forward gears in such a way that in order to change from one gear to the next highest or next lowest gear the switch elements (A, B, C, D, E and M, H, L), acting on the front-mounted and rear-mounted gear groups VS, NS), that have just been actuated only disconnect one switch element and connect one further switch element; the front-mounted group (VS) is formed by coupled, first and second shiftable front-mounted planetary gear sets (VS1, VS2) and a maximum of two further non-shiftable front-mounted planetary gear sets (VSa, VSb), the rear-mounted group (NS) is connected firmly to the front-mounted group (VS) via a spacer shaft (2) rotating at an output speed (nvs) of the front-mounted group (VS) and can be connected to the drive shaft (1) via at least the second switch element (H) acting on the rear-mounted group (NS), the spacer shaft (2) is connected to a spider gear of a second shiftable rear-mounted planetary gear set (NS2) designed as a sun wheel (41), and the output speed (nvs) of the front-mounted group (VS) is generated by selectively engaging a maximum of two of the plurality of switch elements (A, B, C, D, E) acting on the front-mounted group (VS), wherein the plurality of switch elements (A, B, C, D, E) acting on the front-mounted group (VS) comprises first, second and third switch elements (A, B, D), the first shiftable front-mounted planetary gear set (VS1) having a sun wheel (11), a ring gear (13) and a planet carrier (15) with planetary gears (12), as well as the second shiftable front-mounted planetary gear set (VS2) with a sun wheel (21), a ring gear (23) and a planet carrier (25) with planetary gears (22);

a first shiftable rear-mounted planetary gear set (NS1) includes a sun wheel (31), a ring gear (33) and a planet carrier (35) with planetary gears (32);

the second shiftable rear-mounted planetary gear set (NS2) includes the sun wheel (41), a ring gear (43) and a planet carrier (45) with planetary gears (42);

the sun wheel (11) of the first shiftable front-mounted planetary gear set (VS1) can be fixed by the first switch element (A) of the front-mounted group (VS);

the sun wheel (21) of the second shiftable front-mounted planetary gear set (VS2) is connected to the drive shaft (1);

the sun wheel (31) of the first shiftable rear-mounted planetary gear set (NS1) can be connected to the drive shaft (1) by the first switch element (M) of the rear-mounted group (NS);

the ring gear (13) of the first shiftable front-mounted planetary gear set (VS1) and the planet carrier (25) of the second shiftable front-mounted planetary gear set (VS2) are connected to each other and can be fixed by the third switch element (D) of the front-mounted group (VS);

the ring gear (23) of the second shiftable front-mounted planetary gear set (VS2) and the planet carrier (15) of the first shiftable front-mounted planetary gear set (VS1) are connected to each other and via the spacer shaft (2) to the sun wheel (41) of the second shiftable rear-mounted gear set (NS2) and can be fixed by the second switch element (B) of the front-mounted group (VS);

the ring gear (33) of the first shiftable rear-mounted planetary gear set (NS1) and the planet carrier (45) of the second shiftable rear-mounted planetary gear set (NS2) are connected to each other, can be connected to the drive shaft (1) by the second switch element (H) of the rear-mounted group (NS) and can be fixed by the third switch element (L) of the rear-mounted group (NS); and the ring gear (43) of the second shiftable rear-mounted planetary gear set (NS2) and the planet carrier (35) of the first rear-mounted planetary carrier set (NS1) are connected to each other and to the output shaft (3).

21. The multi-step reduction gear pursuant to claim 22, wherein:

the first shiftable front-mounted planetary gear set (VS1) with the sun wheel (11), the ring gear (13) and the planet carrier (15) with planetary gears (12), as well as the second shiftable front-mounted planetary gear set (VS2) with the sun wheel (21), the ring gear (23) and two coupled planet carriers (25', 25") with interior and exterior planetary gears (22', 22");

the first shiftable rear-mounted planetary gear set (NS1) includes a sun wheel (31), a ring gear (33) and two coupled planet carriers (35', 35") with interior and exterior planetary gears (32', 32");

the second shiftable rear-mounted planetary gear set (NS2) includes the sun wheel (41), a ring gear (43) and a planet carrier (45) with planetary gears (42);

the sun wheel (11) of the first shiftable front-mounted planetary gear set (VS1) can be fixed by the first switch element (A) of the front-mounted group (VS);

the sun wheel (21) of the second shiftable front-mounted planetary gear set (VS2) is connected to the drive shaft (1);

the ring gears (13, 23) of the first and second shiftable front-mounted planetary gear sets (VS1, VS2) are connected to each other and can be fixed through the third switch element (D) of the front-mounted group (VS);

the planet carriers (15, 25', 25") of the first and second shiftable front-mounted planetary gear sets (VS1, VS2) are connected to each other, can be fixed by the second switch element (B) of the front-mounted group (VS), and are connected to the sun wheel (41) of the second shiftable rear-mounted planetary gear set (NS2) via the spacer shaft (2);

the sun wheel (31) of the first shiftable rear-mounted planetary gear set (NS1) can be connected to the drive shaft (1) by the first switch element (M) of the rear-mounted group (NS);

the planet carriers (35', 35", 45) of the first and second shiftable rear-mounted planetary gear sets (NS1, NS2) are connected to each other, can be connected to the drive shaft (1) by the second switch element (H) of the rear-mounted group (NS) and can be fixed by the third switch element (L) of the rear-mounted group (NS); and the ring gears (33, 43) of the first and second shiftable rear-mounted planetary gear sets (NS1, NS2) are connected to each other and to the output shaft (3).

22. A multi-step reduction gear, comprising:

a drive shaft (1) connected to a front-mounted gear group (VS), an output shaft (3) connected to a rear-mounted gear group (NS), a plurality of switch elements (A, B, C, D, D) acting on the front-mounted gear group (VS); and first, second and third switch elements (M, H, L) acting on the rear-mounted gear group (NS), and by selectively switching said switch elements (A, B, C, D, E and M, H, L), acting on the front-mounted and rear-mounted gear groups (VS, NS), an input speed (n) of the drive shaft (1) can be transmitted to the output shaft (3) for the purpose of shifting at least seven forward gears in such a way that in order to change from one gear to the next highest or next lowest gear the switch elements (A, B, C, D, E and M, H, L), acting on the front-mounted and rear-mounted gear groups (VS, NS), that have just been actuated only disconnect one switch element and connect one further switch element; the front-mounted group (VS) is formed by coupled, first and second shiftable front-mounted planetary gear sets (VS1, VS2) and a maximum of two further non-shiftable front-mounted planetary gear sets (VSa, VSb), the rear-mounted group (NS) is firmly connected to the front-mounted group (VS) by a spacer shaft (2) rotating at an output speed (nvs) of the front-mounted group (VS) and can be connected to the drive shaft (1) via at least the second switch element (H) acting on the rear-mounted gear set (NS), the spacer shaft (2) is connected to a spider gear of a second rear-mounted planetary gear set (NS2) designed as a ring gear (43), and the output speed (nvs) of the front-mounted group (VS) is generated by selectively engaging a maximum of two switch elements (A, B, C, D, E) acting on the front-mounted group (VS);

wherein the plurality of switch elements (A, B, C, D, E) acting on the front-mounted group (VS) comprises first, second and third switch elements (A, B, D), a shiftable first front-mounted planetary gear set (VS1) with a sun wheel (11), a ring gear (13) and a planet carrier (15) with planetary gears (12), as well as a shiftable second front-mounted planetary gear set (VS2) with a sun wheel (21), a ring gear (23) and a planet carrier (25) with planetary gears (22);

a first shiftable rear-mounted planetary gear set (NS1) includes a sun wheel (31), a ring gear (33) and a planet carrier (35) with planetary gears (32);

the second shiftable rear-mounted planetary gear set (NS2) includes a sun wheel (41), the ring gear (43) and a planet carrier (45) with planetary gears (42);

the sun wheels (11, 21) of the first and second shiftable front-mounted planetary gear sets (VS1, VS2) are connected to each other and can be fixed by the first switch element (A) of the front-mounted group (VS);

the ring gear (23) of the second shiftable front-mounted planetary gear set (VS2) is connected to the drive shaft (1);

the ring gear (13) of the first shiftable front-mounted planetary gear set (VS1) and the planet carrier (25) of the second shiftable front-mounted planetary gear set (VS2) are connected to each other and can be fixed by the third switch element (D) of the front-mounted group (VS);

the planet carrier (15) of the first shiftable front-mounted planetary gear set (VS1) can be fixed by the second switch element (B) of the front-mounted group and is connected to the ring gear (43) of the second shiftable rear-mounted planetary gear set (NS2) via the spacer shaft (2);

the sun wheels (31, 41) of the first and second shiftable rear-mounted planetary gear sets are connected to each other and can be connected to the drive shaft (1) by the first switch element (M) of the rear-mounted group (NS);

the ring gear (33) of the first shiftable rear-mounted planetary gear set (NS1) and the planet carrier (45) of the second rear-mounted planetary carrier set (NS2) are connected to each other, can be connected to the drive shaft (1) via the second switch element (H) of the rear-mounted group (NS) and can be fixed with the third switch element (L) of the rear-mounted group (NS); and the planet carrier (35) of the first shiftable rear-mounted planetary gear set (NS1) is connected to the output shaft (3).

23. A multi-step reduction gear, comprising:
a drive shaft (1) connected to a front-mounted gear group (VS),
an output shaft (3) connected to a rear-mounted gear group (NS),
first and second switch elements (A, B) acting on the front-mounted gear group (VS); and
first, second and third switch elements (M, H, L) acting on the rear-mounted gear group (NS), and by selectively switching said switch elements (A, B, M, H, L), acting on the front-mounted and rear-mounted gear groups (VS, NS), an input speed (n) of the drive shaft (1) can be transmitted to the output shaft (3) for the purpose of shifting at least seven forward gears in such a way that in order to change from one gear to the next highest or next lowest gear the switch elements (A, B, M, H, L), acting on the front-mounted and rear-mounted gear groups (VS, NS), that have just been actuated only disconnect one switch element and connect one further switch element; the rear-mounted group (NS) is a shiftable two-planet carrier/four-shaft transmission with a first and a second shiftable rear-mounted planetary gear set (NS1, NS2), the shiftable rear-mounted group (NS) can be connected to the drive shaft (1) by at least one of the first, second and third switch elements (M, H, L) acting on the shiftable rear-mounted group (NS);

wherein the front-mounted gear group (VS) is formed by first and second shiftable front-mounted planetaries (VS1, VS2), of which at least one is shiftable, the shiftable rear-mounted gear group (NS) is firmly connected to the front-mounted gear group (VS) by a spacer shaft (2) rotating at an output speed (nvs) of the front-mounted gear group (VS), the spacer shaft is not connected to any one of the switch elements (A, B, M, H, L) acting on the front-mounted and rear-mounted gear groups (VS, NS), and the output speed (nvs) of the front-mounted gear group (VS) is generated by selectively engaging one of the first and second switch elements (A, B) acting on the front-mounted gear group (VS) in one of the first and second shiftable front-mounted planetary gear sets (VS1, VS2).

24. The multi-step reduction gear pursuant to claim 23, wherein:
the drive shaft (1) is connected to a sun wheel (11) of the first shiftable front-mounted planetary gear set (VS1);
the drive shaft (1) can be connected to a sun wheel (21) of the second shiftable front-mounted planetary gear set (VS2) via the second switch element (B) of the front-mounted group (VS);
a planet carrier (25) with planetary gears (22) of the second shiftable front-mounted planetary gear set (VS2) is fixed;
a ring gear (13) of the first shiftable front-mounted planetary gear set (VS1) can be connected to the fixed planet carrier (25) of the second shiftable front-mounted planetary gear set (VS2) by the first switch element (A) of the front-mounted group;
the drive shaft (1) can be connected to a sun wheel (31) of the first rear-mounted planetary gear set (NS1) by the first switch element (M) of the rear-mounted group (NS);
the drive shaft (1) can be connected to a planet carrier (45) with planetary gears (42) of the second shiftable rear-mounted planetary gear set (NS2) by the second switch element (H) of the rear-mounted group (NS);
the planet carrier (45) of the second shiftable rear-mounted planetary gear set (NS2) is connected to a ring gear (33) of the first shiftable rear-mounted planetary gear set (NS1);
the planet carrier (45) of the second shiftable rear-mounted planetary gear set (NS2) can be fixed by the third switch element (L) of the rear-mounted group (NS);
a ring gear (23) of the second shiftable front-mounted planetary gear set (VS2) is connected to a planet carrier (15) of the planetary gears (12) of the first shiftable front-mounted planetary gear set (VS1);
a ring gear (23) of the second shiftable front-mounted planetary gear set (VS2) is connected to a sun wheel (41) of the second shiftable rear-mounted planetary gear set (NS2) via the spacer shaft (2);
a ring gear (43) of the second shiftable rear-mounted planetary gear set (NS2) is connected to a planet carrier (35) of the planetary gears (32) of the first shiftable rear-mounted planetary gear set (NS1); and
the ring gear (43) of the second shiftable rear-mounted planetary gear set (NS2) is connected to the output shaft (3).

25. The multi-step reduction gear pursuant to claim 2, wherein a second rear-mounted group (NS') is a shiftable two-planet carrier/four-shaft transmission arranged after the rear-mounted group (NS), and at least eighteen forward gears can be created, the second rear-mounted group (NS') is formed by two shiftable rear-mounted planetary gear sets (NS1', NS2'), the first switch element (M') is a brake and the second switch element (H') is a clutch, is securely connected on the input side to the output shaft (3) rotating at an output speed (nns) of the rear-mounted group (NS) and can be connected to the drive shaft (1) via the second switch element (H') of the second rear-mounted group (NS') and is connected on the output side to the output shaft (4) of the multi-step reduction gear, as well.

26. The multi-step reduction gear pursuant to claim 25, wherein:
the first shiftable rear-mounted planetary gear set (NS1') of the second rear-mounted group (NS') includes a sun wheel (51), a ring gear (53) and a planet carrier (55) with planetary gears (52);
the second shiftable rear-mounted planetary gear set (NS2') of the second rear-mounted group (NS') includes a sun wheel (61), a ring gear (63) and a planet carrier (65) with planetary gears (62);
the sun wheels (51, 61) of the first and second shiftable rear-mounted planetary gear sets (NS1', NS2') of the second rear-mounted group (NS') are connected to each other and can be fixed by the first switch element (M') of the second rear-mounted group (NS');
the ring gear (53) of the first shiftable rear-mounted planetary gear set (NS1') of the second rear-mounted group (NS') and the planet carrier (65) of the second shiftable rear-mounted planetary gear set (NS2') of the second rear-mounted group (NS') am connected to each other and can be connected to the drive shaft (1) via the second switch element (H') of the second rear-mounted group (NS');
the ring gear (63) of the second shiftable rear-mounted planetary gear set (NS2') of the second rear-mounted group (NS') is connected to the output shaft (3) and
the planet carrier (55) of the first shiftable rear-mounted planetary gear set (NS1) of the second rear-mounted group (NS') is connected to the output shaft (4).

27. The multi-step reduction gear pursuant to claim 25, wherein:
the first shiftable rear-mounted planetary gear set (NS1') of the second rear-mounted group (NS') includes a sun wheel (51), a ring gear (53) and a planet carrier (55) with planetary gears (52);
the second shiftable rear-mounted planetary gear set (NS2') of the second rear-mounted group (NS') includes a sun wheel (61), a ring gear (63) and two coupled planet carriers (65', 65") with interior and exterior planetary gears (62', 62");
the sun wheel (51) of the first shiftable rear-mounted planetary gear set (NS1') of the second rear-mounted group (NS') can be fixed by the first switch element (M') of the second rear-mounted group (NS');
the ring gears (53, 63) of the first and second shiftable rear-mounted planetary gear sets (NS1', NS2') of the second rear-mounted group (NS') are connected to each other and can be connected to the drive shaft (1) via the second switch element (H') of the second rear-mounted group (NS');
the sun wheel (61) of the second shiftable rear-mounted planetary gear set (NS2') of the second rear-mounted group (NS') is connected to the output shaft (3); and
the planet carriers (55, 65', 65") of the first and second shiftable rear-mounted planetary gear sets (NS1', NS2') of the second rear-mounted group (NS') are connected to each other and to the output shaft (4).

28. The multi-step reduction gear pursuant to claim 26, wherein:
the drive shaft (1) is connected to a sun wheel (11a) of a third front-mounted planetary gear set (VSa);
the drive shaft (1) can be connected to a planet carrier (25) with planetary gears (22) of the second shiftable front-mounted planetary gear set (VS2) via the fifth switch element (E) of the front-mounted group (VS);
the drive shaft (1) can be connected to a ring gear (13) of the first shiftable front-mounted planetary gear set (VS1) via the first switch element (A) of the front-mounted group (VS);
the drive shaft (1) can be connected to a planet carrier (45) with planetary gears (42) of the second shiftable rear-mounted planetary gear set (NS2) via the second switch element (H) of the rear-mounted group (NS);
the third front-mounted planetary gear set (VSa) is a plus-transmission;
a planet carrier (15a') with interior planetary gears (12a') of the third front-mounted planetary gear set (VSa) and a planet carrier (15a") with exterior planetary gears (12a") of the third front-mounted planetary gear set (VSa) are connected to each other and fixed;
a ring gear (13a) of the third front-mounted planetary gear set (VSa) can be connected to a sun wheel (21) of the second shiftable front-mounted planetary gear set (VS2) by the second switch element (B) of the front-mounted group;
the ring gear (13a) of the third front-mounted planetary gear set (VSa) can be connected to the planet carrier (25) of the second shiftable front-mounted planetary gear set (VS2) by a fourth switch element (D) of the front-mounted group;
the sun wheel (21) of the second shiftable front-mounted planetary gear set (VS2) is connected to a sun wheel (11) of the first shiftable front-mounted planetary gear set (VS1);
the sun wheel (21) of the second shiftable front-mounted planetary gear set (VS2) can be fixed by the third switch element (C) of the front-mounted group (VS);
the ring gear (13) of the first front-mounted, planetary shiftable (VS1) is connected to a ring gear (23) of the second shiftable front-mounted planetary gear set (VS2);
a planet carrier (15) with planetary gears (12) of the first shiftable front-mounted planetary gear set (VS1) is connected to a sun wheel (41) of the second shiftable rear-mounted planetary gear set (NS2) via the spacer shaft (2);
the planet carrier (15) of the first shiftable front-mounted planetary gear set (VS1) is connected to a ring gear (33) of the first shiftable rear-mounted planetary gear set (NS1);
the planet carrier (45) of the second shiftable rear-mounted planetary gear set (NS2) and a planet carrier (35) comprising planetary gears (32) of the first shiftable rear-mounted planetary gear set (NS1) are connected to each other;
a sun wheel (31) of the first shiftable rear-mounted planetary gear set (NS1) can be fixed by the first switch element (M) of the rear-mounted group (NS); and
a ring gear (43) of the second shiftable rear-mounted planetary gear set (NS2) is connected to the second rear-mounted group (NS) via the output shaft (3).

* * * * *